US012777124B2

(12) United States Patent
Komamiya et al.

(10) Patent No.: US 12,777,124 B2
(45) Date of Patent: Oct. 27, 2026

(54) IMAGE PROCESSING APPARATUS FOR REALIZING HIGH-QUALITY PRINTING, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Eiji Komamiya, Kanagawa (JP); Daisuke Kobayashi, Kanagawa (JP); Hirokazu Tanaka, Tokyo (JP); Mayuko Yamagata, Tokyo (JP); Tsukasa Doi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 18/798,260

(22) Filed: Aug. 8, 2024

(65) Prior Publication Data

US 2025/0053764 A1 Feb. 13, 2025

(30) Foreign Application Priority Data

Aug. 10, 2023 (JP) ................................ 2023-131461
Jun. 24, 2024 (JP) ................................ 2024-101423

(51) Int. Cl.
*H04N 1/409* (2006.01)
*G06K 15/02* (2006.01)
*G06K 15/10* (2006.01)

(52) U.S. Cl.
CPC ......... *H04N 1/4092* (2013.01); *G06K 15/102* (2013.01); *G06K 15/1894* (2013.01)

(58) Field of Classification Search
CPC . H04N 1/4092; G06K 15/102; G06K 15/1894
See application file for complete search history.

(56) References Cited

U.S. PATENT DOCUMENTS

| | | | | |
|---|---|---|---|---|
| 6,554,396 | B1 | 4/2003 | Mizutani | |
| 2015/0174929 | A1* | 6/2015 | Yamaguchi | G06K 15/107 347/16 |
| 2015/0174930 | A1* | 6/2015 | Yamaguchi | B41J 2/2132 347/16 |
| 2017/0087822 | A1* | 3/2017 | Kayanaka | G06K 15/107 |
| 2019/0313764 | A1* | 10/2019 | Yamasaki | B41J 3/4073 |

FOREIGN PATENT DOCUMENTS

JP 3559737 B2 9/2004

OTHER PUBLICATIONS

U.S. Appl. No. 18/798,409, filed Aug. 8, 2024, Mayuko Yamagata.

* cited by examiner

*Primary Examiner* — Nicholas Pachol
(74) *Attorney, Agent, or Firm* — Venable LLP

(57) ABSTRACT

Print data is generated so that a first edge region of an object where a ratio of pixels printed by at least one element in a first array to pixels in the first edge region is lower than a ratio of pixels printed by at least one element in a second array is a region contacting a boundary where the object changes to a margin region of a medium when viewed in a first direction, and a second edge region of the object where a ratio of pixels printed by at least one element in the second array to pixels in the second edge region is lower than a ratio of pixels printed by at least one element in the first array is a region contacting a boundary where the object changes to the margin region of the medium when viewed in a second direction.

12 Claims, 29 Drawing Sheets

FIG. 7A
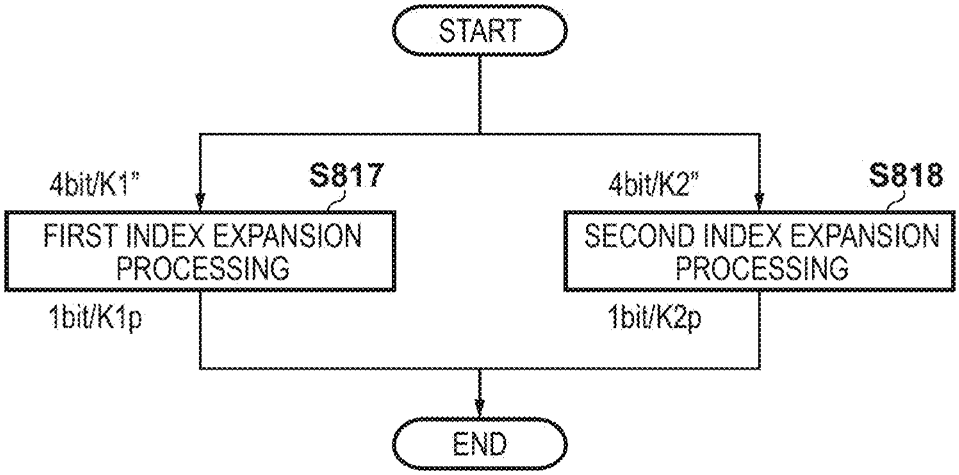
FIG. 7B
| In | Out |
|---|---|
| 0 | 0 |
| 1 | 1 |
| ⋮ | ⋮ |
| 254 | 254 |
| 255 | 255 |
FIG. 7C
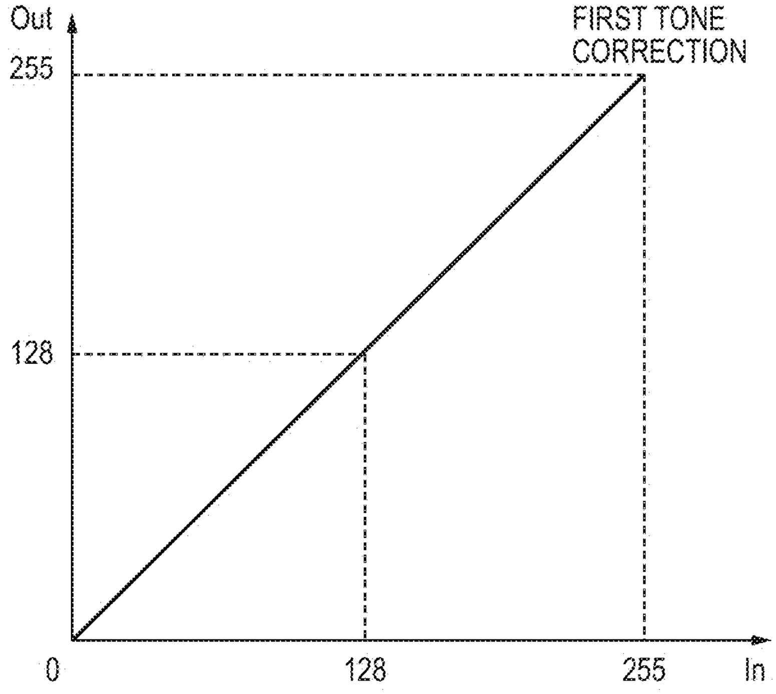

FIRST SCANNING DIRECTION
1508
1507
1506
PRINT SHEET

FIRST SCANNING DIRECTION
1508
1507
1506
PRINT SHEET

FIRST SCANNING DIRECTION
1508
1506
1507
PRINT SHEET

FIRST SCANNING DIRECTION
1506
1507
1508
PRINT SHEET

SECOND SCANNING DIRECTION
1508
1507
1506
PRINT SHEET

SECOND SCANNING DIRECTION
1508
1507
1506
PRINT SHEET

SECOND SCANNING DIRECTION
1508
1507
1506
PRINT SHEET

SECOND SCANNING DIRECTION
1508
1507
1506
PRINT SHEET

| | X0 | X1 | X2 | X3 | X4 | X5 | X6 | X7 | X8 | X9 | X10 | X11 | X12 | X13 | X14 | X15 | X16 | X17 | X18 | X19 |
|---|---|---|---|---|---|---|---|---|---|---|---|---|---|---|---|---|---|---|---|---|
| Y0 | | | | | | | | | | | | | | | | | | | | |
| Y1 | | | | | | | | | O | O | O | O | | | | | | | | |
| Y2 | | | | | | | E | E | E | E | E | E | E | | | | | | | |
| Y3 | | | | | O | O | O | O | O | O | O | O | O | O | | | | | | |
| Y4 | | | | E | E | E | E | | | | E | E | E | E | E | | | | | |
| Y5 | | | O | O | O | | | | | | | | O | O | O | | | | | |
| Y6 | | E | E | E | | | | | | | | | E | E | E | | | | | |
| Y7 | O | O | O | O | | | | | | | | | O | O | O | | | | | |
| Y8 | E | E | E | | | | | | | | | | E | E | E | | | | | |
| Y9 | | | | | | | | | | | O | O | O | O | O | | | | | |
| Y10 | | | | | | | E | E | E | E | E | E | E | E | E | | | | | |
| Y11 | | | | | O | O | O | O | O | | | O | O | O | O | | | | | |
| Y12 | | | E | E | E | E | E | E | | | | E | E | E | E | | | | | |
| Y13 | | O | O | O | O | O | | | | | | O | O | O | O | | | | | |
| Y14 | E | E | E | E | | | | | | | | E | E | E | E | | | | | |
| Y15 | O | O | O | O | | | | | | | O | O | O | O | O | | | O | O | |
| Y16 | E | E | E | E | | | | | | E | E | E | E | E | E | E | E | E | E | |
| Y17 | | O | O | O | O | O | O | O | O | O | O | | O | O | O | O | O | O | | |
| Y18 | | | E | E | E | E | E | E | E | E | | | | E | E | E | E | | | |
| Y19 | | | | | | | | | | | | | | | | | | | | |

X: CARRIAGE SCANNING DIRECTION

Y: FEEDING DIRECTION

| | X0 | X1 | X2 | X3 | X4 | X5 | X6 | X7 | X8 | X9 | X10 | X11 | X12 | X13 | X14 | X15 | X16 | X17 | X18 | X19 |
|---|---|---|---|---|---|---|---|---|---|---|---|---|---|---|---|---|---|---|---|---|
| Y0 | | | | | | | | | | | | | | | | | | | | |
| Y1 | | | | | | | | | 2 | 0 | 0 | 1 | | | | | | | | |
| Y2 | | | | | | | 2 | 0 | 0 | 0 | 0 | 0 | 1 | | | | | | | |
| Y3 | | | | | 2 | 0 | 0 | 0 | 0 | 0 | 0 | 0 | 0 | 1 | | | | | | |
| Y4 | | | | 2 | 0 | 0 | 1 | | | | 2 | 0 | 0 | 0 | 1 | | | | | |
| Y5 | | | 2 | 0 | 1 | | | | | | | | 2 | 0 | 1 | | | | | |
| Y6 | | 2 | 0 | 1 | | | | | | | | | 2 | 0 | 1 | | | | | |
| Y7 | 2 | 0 | 0 | 1 | | | | | | | | | 2 | 0 | 1 | | | | | |
| Y8 | 2 | 0 | 1 | | | | | | | | | | 2 | 0 | 1 | | | | | |
| Y9 | | | | | | | | | | | 2 | 0 | 0 | 0 | 1 | | | | | |
| Y10 | | | | | | | 2 | 0 | 0 | 0 | 0 | 0 | 0 | 0 | 1 | | | | | |
| Y11 | | | | | 2 | 0 | 0 | 0 | 1 | | | 2 | 0 | 0 | 1 | | | | | |
| Y12 | | | 2 | 0 | 0 | 0 | 0 | 1 | | | | 2 | 0 | 0 | 1 | | | | | |
| Y13 | | 2 | 0 | 0 | 0 | 1 | | | | | | 2 | 0 | 0 | 1 | | | | | |
| Y14 | 2 | 0 | 0 | 1 | | | | | | | | 2 | 0 | 0 | 1 | | | | | |
| Y15 | 2 | 0 | 0 | 1 | | | | | | | 2 | 0 | 0 | 0 | 1 | | | 2 | 1 | |
| Y16 | 2 | 0 | 0 | 1 | | | | | | 2 | 0 | 0 | 0 | 0 | 0 | 0 | 0 | 0 | 1 | |
| Y17 | | 2 | 0 | 0 | 0 | 0 | 0 | 0 | 0 | 0 | 1 | | 2 | 0 | 0 | 0 | 0 | 1 | | |
| Y18 | | | 2 | 0 | 0 | 0 | 0 | 0 | 0 | 1 | | | | 2 | 0 | 0 | 1 | | | |
| Y19 | | | | | | | | | | | | | | | | | | | | |

| | X0 | X1 | X2 | X3 | X4 | X5 | X6 | X7 | X8 | X9 | X10 | X11 | X12 | X13 | X14 | X15 | X16 | X17 | X18 | X19 |
|---|---|---|---|---|---|---|---|---|---|---|---|---|---|---|---|---|---|---|---|---|
| Y0 | | | | | | | | | | | | | | | | | | | | |
| Y1 | | | | | | | | | O | E | O | E | | | | | | | | |
| Y2 | | | | | | | E | O | E | O | E | O | E | | | | | | | |
| Y3 | | | | | O | E | O | E | O | E | O | E | O | E | | | | | | |
| Y4 | | | | O | E | O | E | | | | E | O | E | O | E | | | | | |
| Y5 | | | O | E | O | | | | | | | | O | E | O | | | | | |
| Y6 | | O | E | O | | | | | | | | | E | O | E | | | | | |
| Y7 | O | E | O | E | | | | | | | | | O | E | O | | | | | |
| Y8 | E | O | E | | | | | | | | | | E | O | E | | | | | |
| Y9 | | | | | | | | | | | O | E | O | E | O | | | | | |
| Y10 | | | | | | | E | O | E | O | E | O | E | O | E | | | | | |
| Y11 | | | | | O | E | O | E | O | | | E | O | E | O | | | | | |
| Y12 | | | E | O | E | O | E | O | | | | O | E | O | E | | | | | |
| Y13 | | E | O | E | O | E | | | | | | E | O | E | O | | | | | |
| Y14 | E | O | E | O | | | | | | | | O | E | O | E | | | | | |
| Y15 | O | E | O | E | | | | | | | O | E | O | E | O | | | E | O | |
| Y16 | E | O | E | O | | | | | | O | E | O | E | O | E | O | E | O | E | |
| Y17 | | E | O | E | O | E | O | E | O | E | O | | O | E | O | E | O | E | | |
| Y18 | | | E | O | E | O | E | O | E | O | | | | O | E | O | E | | | |
| Y19 | | | | | | | | | | | | | | | | | | | | |

| | X0 | X1 | X2 | X3 | X4 | X5 | X6 | X7 | X8 | X9 | X10 | X11 | X12 | X13 | X14 | X15 | X16 | X17 | X18 | X19 |
|---|---|---|---|---|---|---|---|---|---|---|---|---|---|---|---|---|---|---|---|---|
| Y0 | | | | | | | | | | | | | | | | | | | | |
| Y1 | | | | | | | | | 2 | 0 | 0 | 1 | | | | | | | | |
| Y2 | | | | | | | 2 | 0 | 0 | 0 | 0 | 0 | 1 | | | | | | | |
| Y3 | | | | | 2 | 0 | 0 | 0 | 0 | 0 | 0 | 0 | 0 | 1 | | | | | | |
| Y4 | | | | 2 | 0 | 0 | 1 | | | | 2 | 0 | 0 | 0 | 1 | | | | | |
| Y5 | | | 2 | 0 | 1 | | | | | | | | 2 | 0 | 1 | | | | | |
| Y6 | | 2 | 0 | 1 | | | | | | | | | 2 | 0 | 1 | | | | | |
| Y7 | 2 | 0 | 0 | 1 | | | | | | | | | 2 | 0 | 1 | | | | | |
| Y8 | 2 | 0 | 1 | | | | | | | | | | 2 | 0 | 1 | | | | | |
| Y9 | | | | | | | | | | | 2 | 0 | 0 | 0 | 1 | | | | | |
| Y10 | | | | | | | 2 | 0 | 0 | 0 | 0 | 0 | 0 | 0 | 1 | | | | | |
| Y11 | | | | | 2 | 0 | 0 | 0 | 1 | | | 2 | 0 | 0 | 1 | | | | | |
| Y12 | | | 2 | 0 | 0 | 0 | 0 | 1 | | | | 2 | 0 | 0 | 1 | | | | | |
| Y13 | | 2 | 0 | 0 | 0 | 1 | | | | | | 2 | 0 | 0 | 1 | | | | | |
| Y14 | 2 | 0 | 0 | 1 | | | | | | | | 2 | 0 | 0 | 1 | | | | | |
| Y15 | 2 | 0 | 0 | 1 | | | | | | | 2 | 0 | 0 | 0 | 1 | | | 2 | 1 | |
| Y16 | 2 | 0 | 0 | 1 | | | | | | 2 | 0 | 0 | 0 | 0 | 0 | 0 | 0 | 0 | 1 | |
| Y17 | | 2 | 0 | 0 | 0 | 0 | 0 | 0 | 0 | 0 | 1 | | 2 | 0 | 0 | 0 | 0 | 1 | | |
| Y18 | | | 2 | 0 | 0 | 0 | 0 | 0 | 0 | 1 | | | | 2 | 0 | 0 | 1 | | | |
| Y19 | | | | | | | | | | | | | | | | | | | | |

| | X0 | X1 | X2 | X3 | X4 | X5 | X6 | X7 | X8 | X9 | X10 | X11 | X12 | X13 | X14 | X15 | X16 | X17 | X18 | X19 |
|---|---|---|---|---|---|---|---|---|---|---|---|---|---|---|---|---|---|---|---|---|
| Y0 | | | | | | | | | | | | | | | | | | | | |
| Y1 | | | | | | | | | E | E | O | O | | | | | | | | |
| Y2 | | | | | | | E | O | E | O | E | O | O | | | | | | | |
| Y3 | | | | | E | E | O | E | O | E | O | E | O | O | | | | | | |
| Y4 | | | | E | E | O | O | | | | E | O | E | O | O | | | | | |
| Y5 | | | E | E | O | | | | | | | | E | E | O | | | | | |
| Y6 | | E | E | O | | | | | | | | | E | O | O | | | | | |
| Y7 | E | E | O | O | | | | | | | | | E | E | O | | | | | |
| Y8 | E | O | O | | | | | | | | | | E | O | O | | | | | |
| Y9 | | | | | | | | | | | E | E | O | E | O | | | | | |
| Y10 | | | | | | | E | O | E | O | E | O | E | O | O | | | | | |
| Y11 | | | | | E | E | O | E | O | | | E | O | E | O | | | | | |
| Y12 | | | E | O | E | O | E | O | | | | O | E | O | O | | | | | |
| Y13 | | E | O | E | O | O | | | | | | E | O | E | O | | | | | |
| Y14 | E | O | E | O | | | | | | | | O | E | O | O | | | | | |
| Y15 | E | E | O | O | | | | | | | O | E | O | E | O | | | E | O | |
| Y16 | E | O | E | O | | | | | | O | E | O | E | O | E | O | E | O | O | |
| Y17 | | E | O | E | O | E | O | E | O | E | O | | O | E | O | E | O | O | | |
| Y18 | | | E | O | E | O | E | O | E | O | | | | E | E | O | O | | | |
| Y19 | | | | | | | | | | | | | | | | | | | | |

IMAGE PROCESSING APPARATUS FOR REALIZING HIGH-QUALITY PRINTING, IMAGE PROCESSING METHOD, AND NON-TRANSITORY COMPUTER-READABLE STORAGE MEDIUM

BACKGROUND OF THE INVENTION

Field of the Invention

The present invention relates to an image processing technique.

Description of the Related Art

Conventionally, there is known an inkjet printing apparatus that prints an image on a print medium by discharging ink onto the print medium from a printhead including a print element array formed by arraying a plurality of print elements while relatively moving at least one of the print medium and the printhead.

Among inkjet methods, a bubble jet printing method (BJ) is a method of abruptly heating and vaporizing ink by a heating element and discharging an ink droplet from an orifice by the pressure of a generated bubble. A bubble generated in a bubble jet printhead having such structure is cooled by surrounding ink, the vapor of ink in the bubble is condensed into a liquid, and thus the bubble finally disappears. On the other hand, ink is filled (refilled) from an ink tank storing ink via an ink supply path by an amount consumed by discharge.

Immediately after a nozzle provided with a print element discharges ink, a tailing state of ink in which ink is not separated from the nozzle is formed. After that, a main droplet portion starts to be formed on the front side in a discharge direction. When the main droplet portion overcomes surface tension, the main droplet portion is divided into a main droplet and a plurality of sub-droplets (satellites), and the main droplet and the plurality of satellites separately fly. Finally, the main droplet and the plurality of satellites land on a print medium.

As in the above-described example, since a plurality of accompanying satellites unwantedly land on a print medium in addition to a main droplet by ink discharge from each nozzle, this causes image deterioration especially in an edge region of an image, which is a boundary between a printing portion and a non-printing portion.

In consideration of the above problem, there has been proposed a technique disclosed in Japanese Patent No. 3559737. Japanese Patent No. 3559737 discloses a technique capable of realizing high-quality lines and characters with sharp edge regions by making satellites land inside a pixel region formed by a main droplet at the time of driving one of nozzle arrays in accordance with the scanning direction of a carriage in a case where sub-droplets accompanying the main droplet of discharged ink fly at a constant angle.

However, as disclosed in Japanese Patent No. 3559737, when driving one of print element arrays in accordance with the scanning direction of the carriage, image quality deteriorates and throughput decreases.

For example, print data used to print a first print region in a first scanning direction is first print data that limits the use ratio of a first nozzle array. On the other hand, a second print region adjacent to the first print region in a print sheet conveyance direction is printed in a second scanning direction reverse to the first scanning direction. Print data used to print the second print region in the second scanning direction is second print data that limits the use ratio of a second nozzle array. Since different print data is used in accordance with the print sheet conveyance direction on a print medium, the image uniformity with the adjacent print region degrades, thereby causing deterioration in image quality.

In addition, since the two types of print data of the first print data for the first scanning direction and the second print data for the second scanning direction are generated, the processing time increases. For next carriage scanning after the first scanning direction, the second scanning direction as a reverse scanning direction is not always optimum depending on the arrangement of input image data. The first print region is printed in the first scanning direction, and the carriage is stopped at a print end position. If there is print data only in the advancing direction of the first scanning direction from the carriage stop position in the second print region adjacent to the first print region, the scan time becomes shortest by performing a next scan in the first scanning direction. In this case, if the scanning direction of each print region is decided and then print data is generated, it takes the processing time before the start of carriage scanning, thereby decreasing the throughput.

SUMMARY OF THE INVENTION

The present invention provides a technique for suppressing deterioration in image quality and a decrease in throughput while realizing high-quality printing even in a case where satellites accompanying a main droplet of ink discharged in accordance with a scanning direction fly at a constant flight distance.

According to the first aspect of the present invention, there is provided an image processing apparatus comprising: an acquisition unit configured to acquire an input image including a target object; and a generation unit configured to generate, based on the input image, print data representing the presence/absence of application of an ink droplet from a print unit, wherein the print unit includes a first print element array and a second print element array in each of which print elements each for applying an ink droplet are arrayed, and reciprocally scans in a first direction and a second direction reverse to the first direction, and the generation unit generates the print data so that a first edge region of the target object where a ratio of pixels printed by at least one print element included in the first print element array to a plurality of pixels included in the first edge region is lower than a ratio of pixels printed by at least one print element included in the second print element array is a region contacting a boundary at which the object changes to a margin region of a print medium when viewed in the first direction, and a second edge region of the target object where a ratio of pixels printed by at least one print element included in the second print element array to a plurality of pixels included in the second edge region is lower than a ratio of pixels printed by at least one print element included in the first print element array is a region contacting a boundary at which the object changes to the margin region of the print medium when viewed in the second direction.

According to the second aspect of the present invention, there is provided an image processing method comprising: acquiring an input image including a target object; and generating, based on the input image, print data representing the presence/absence of application of an ink droplet from a print unit, wherein the print unit includes a first print element array and a second print element array in each of which print elements each for applying an ink droplet are arrayed, and reciprocally scans in a first direction and a second direction reverse to the first direction, and the print data is generated so that a first edge region of the target object where a ratio of pixels printed by at least one print element included in the first print element array to a plurality of pixels included in the first edge region is lower than a ratio of pixels printed by at least one print element included in the second print element array is a region contacting a boundary at which the object changes to a margin region of a print medium when viewed in the first direction, and a second edge region of the target object where a ratio of pixels printed by at least one print element included in the second print element array to a plurality of pixels included in the second edge region is lower than a ratio of pixels printed by at least one print element included in the first print element array is a region contacting a boundary at which the object changes to the margin region of the print medium when viewed in the second direction.

According to the third aspect of the present invention, there is provided a non-transitory computer-readable storage medium storing a computer program for causing a computer to function as: an acquisition unit configured to acquire an input image including a target object; and a generation unit configured to generate, based on the input image, print data representing the presence/absence of application of an ink droplet from a print unit, wherein the print unit includes a first print element array and a second print element array in each of which print elements each for applying an ink droplet are arrayed, and reciprocally scans in a first direction and a second direction reverse to the first direction, and the generation unit generates the print data so that a first edge region of the target object where a ratio of pixels printed by at least one print element included in the first print element array to a plurality of pixels included in the first edge region is lower than a ratio of pixels printed by at least one print element included in the second print element array is a region contacting a boundary at which the object changes to a margin region of a print medium when viewed in the first direction, and a second edge region of the target object where a ratio of pixels printed by at least one print element included in the second print element array to a plurality of pixels included in the second edge region is lower than a ratio of pixels printed by at least one print element included in the first print element array is a region contacting a boundary at which the object changes to the margin region of the print medium when viewed in the second direction.

Further features of the present invention will become apparent from the following description of exemplary embodiments with reference to the attached drawings.

BRIEF DESCRIPTION OF THE DRAWINGS

FIGS. 7A to 7C are views showing processing of the image processing unit;

DESCRIPTION OF THE EMBODIMENTS

Figure 1:
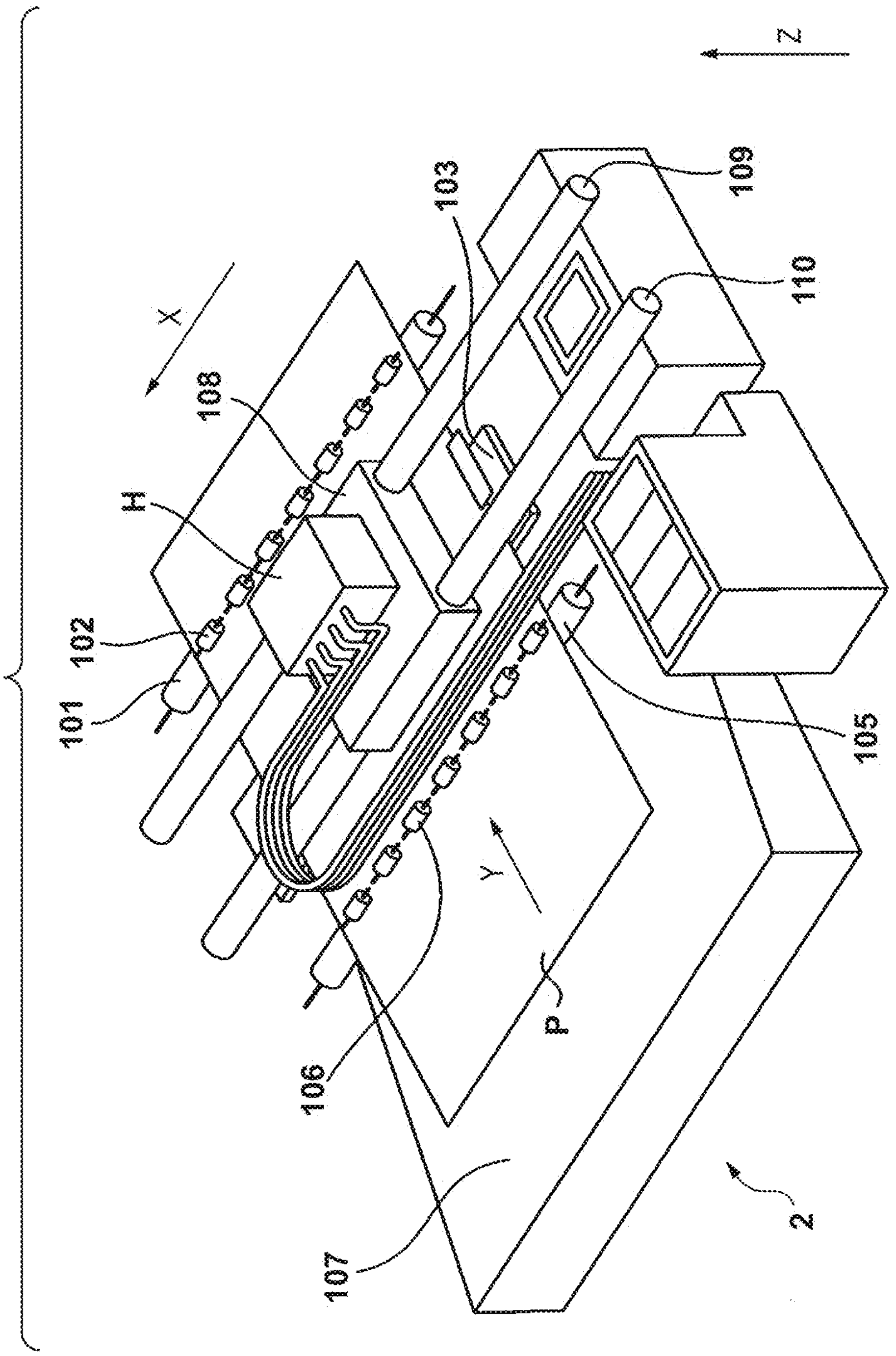
FIG. 1 is a view showing the configuration of a printing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<Structure of Printing Apparatus>

The structure of a printing apparatus according to this embodiment will be described below with reference to FIG. 1. FIG. 1 is a perspective view showing an overview of a print unit in a printing apparatus 2 (to be also simply referred to as a printing apparatus hereinafter). A print medium P (to be also simply referred to as a print medium hereinafter) fed to the print unit is conveyed in the −Y direction (sub-scanning direction) by a nip portion between a conveyance roller 101 arranged on a conveyance path and a pinch roller 102 driven by the conveyance roller 101 along with the rotation of the conveyance roller 101. A platen 103 is provided at a print position facing a surface (nozzle surface) on which nozzles of a printhead H adopting an inkjet printing method are formed, and maintains the distance between the front surface of the print medium P and the nozzle surface of the printhead H constant by supporting the back surface of the print medium P from below. The print medium P whose region is printed on the platen 103 is conveyed in the −Y direction along with the rotation of the discharge roller 105 while being nipped by a discharge roller 105 and a spur 106 driven by the discharge roller 105, and is then discharged to a discharge tray 107.

The printhead H is detachably mounted on a carriage 108 in a posture that the nozzle surface faces the platen 103 or the print medium. The carriage 108 is moved reciprocally in the X direction as the main scanning direction along two guide rails 109 and 110 by the driving force of a carriage motor (not shown). In the process of the movement, the printhead H executes a discharge operation according to a discharge signal. The +X direction in which the carriage 108 moves is a direction orthogonal to the −Y direction in which the print medium is conveyed, and is called the main scanning direction. To the contrary, the −Y direction of conveyance of the print medium is called the sub-scanning direction. By alternately repeating main scanning (movement with a discharge operation) of the carriage 108 and the printhead H and conveyance (sub-scanning) of the print medium, an image is formed stepwise on the print medium P. The contents of the structure of the printing apparatus according to this embodiment have been described.

<Structure of Printhead>

Figure 9A:
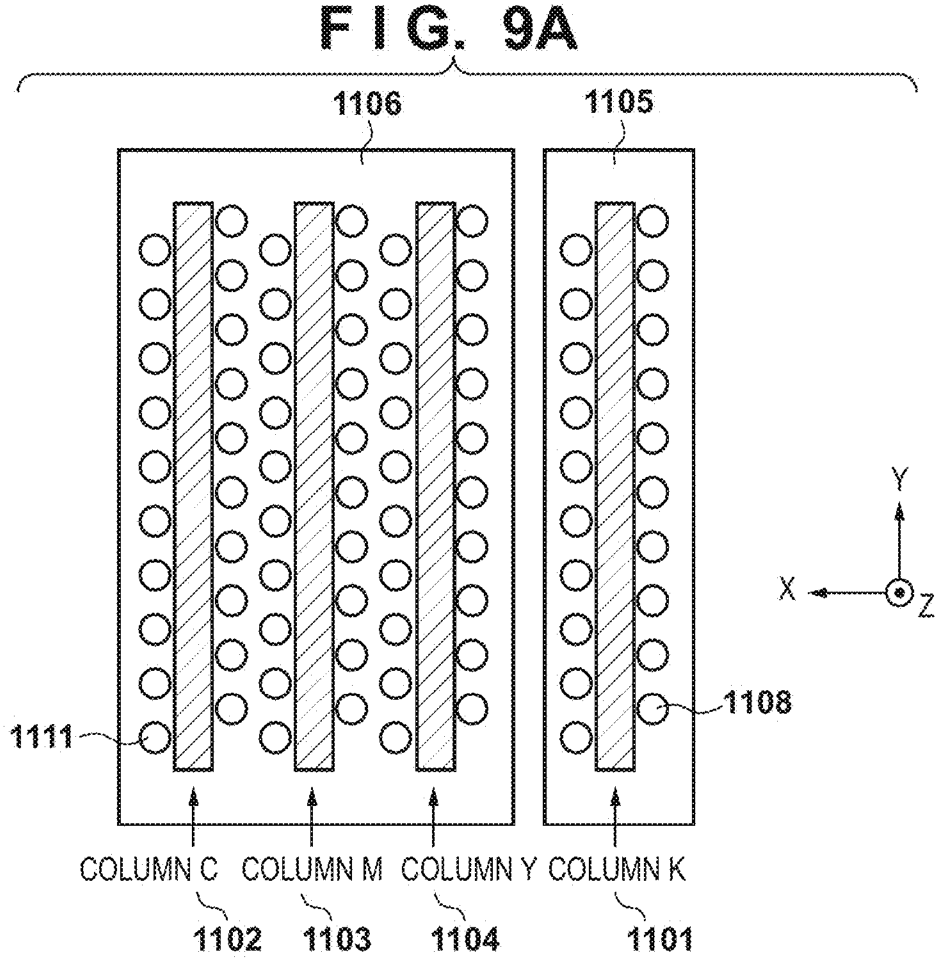
FIGS. 9A to 9C are views showing the configuration of a printhead.
Figure 9B:
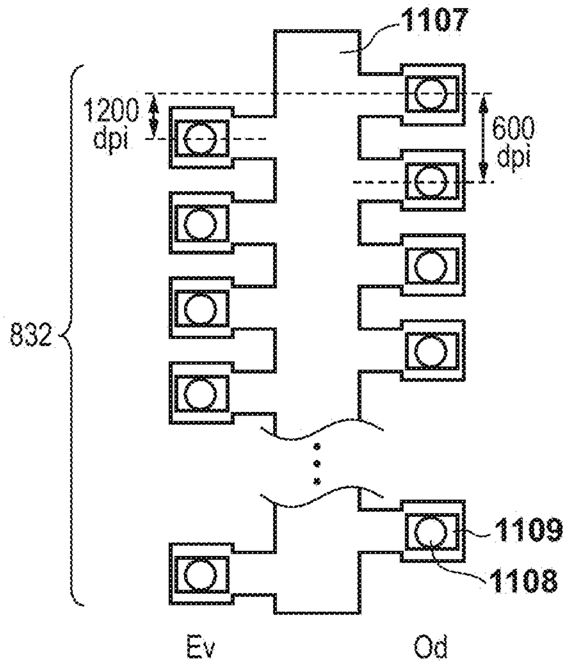
Figure 9C:
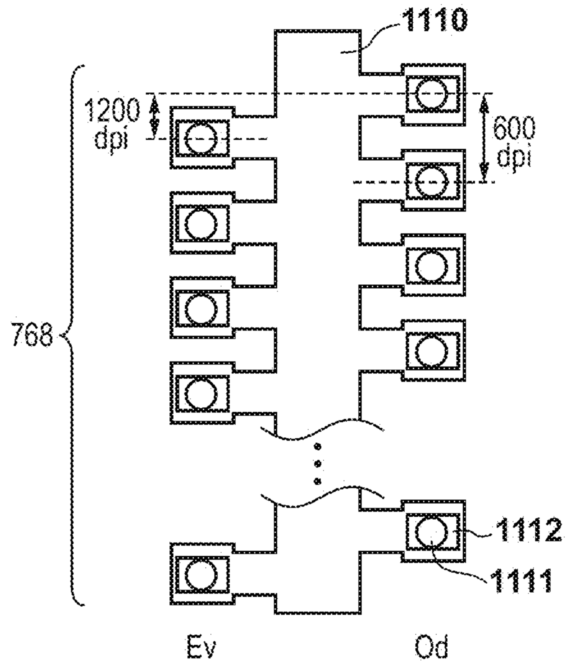

The structure of the printhead according to this embodiment will be described below with reference to FIGS. 9A to 9C. FIGS. 9A to 9C are schematic views of the printhead H used in this embodiment when viewed from the upper surface of the printing apparatus. The lower side of each of FIGS. 9A to 9C is a side on which the printing apparatus discharges a print medium. The printhead H includes print chips 1105 and 1106, and each print chip receives a print signal from the main body of the printing apparatus via a contact pad (not shown), and is supplied with power necessary to drive the printhead. As shown in FIG. 9A, on the print chip 1105, a nozzle array 1101 (to be also referred to as a black nozzle array hereinafter) in which a plurality of nozzles for discharging black ink are arrayed in the Y direction is arranged. Similarly, on the print chip 1106, a nozzle array 1102 for discharging cyan ink, a nozzle array 1103 for discharging magenta ink, and a nozzle array 1104 for discharging yellow ink are arranged.

FIG. 9B is an enlarged view of the nozzle array 1101 of the print chip 1105. FIG. 9C is an enlarged view of one nozzle array among the nozzle arrays 1102, 1103, and 1104, that is, three nozzle arrays of cyan, magenta, and yellow in total. This enlarged view is common to color inks. Nozzles 1108 or 1111 for discharging ink are arranged on two sides of an ink liquid chamber 1107 or 1110. A heater 1109 or 1112 is arranged as a print element for discharge immediately below each nozzle (on the +Z direction side). The heater 1109 or 1112 is a so-called electrothermal conversion type print element, and when the heater 1109 or 1112 is applied with a voltage, it generates heat to generate a bubble, thereby causing the corresponding nozzle to discharge an ink droplet. There are arranged 832 nozzles 1108 and 768 nozzles 1111.

Each nozzle 1108 discharges black ink. The nozzle array 1101 includes a first nozzle array and a second nozzle array in each of which the nozzles 1108 are arrayed at a pitch of 600 dpi in the Y direction. Each nozzle of the first nozzle array is arranged by being shifted by a half pitch, that is, 1,200 dpi in the −Y direction with respect to each nozzle of the second nozzle array. By performing print scanning using the nozzle array 1101 having the above configuration, the print medium can be printed with a print density of 1,200 dpi. Each of the nozzle arrays 1102, 1103, and 1104 has the same configuration as that of the nozzle array 1101.

Note that the printhead H of this embodiment has a configuration including the print chip with the black nozzle array and the print chip with the cyan nozzle array, the magenta nozzle array, and the yellow nozzle array but the present invention is not limited to this configuration. More specifically, all the black nozzle array, the cyan nozzle array, the magenta nozzle array, and the yellow nozzle array may be mounted on one chip. Alternatively, a printhead on which a print chip with a black nozzle array is mounted may be separated from a printhead on which a print chip with a cyan nozzle array, a magenta nozzle array, and a yellow nozzle array is mounted. Alternatively, a black nozzle array, a cyan nozzle array, a magenta nozzle array, and a yellow nozzle array may be mounted on different printheads, respectively. Furthermore, the printhead H of this embodiment adopts a so-called bubble jet method of discharging ink by applying a voltage to a heater to generate heat but the present invention is not limited to this. More specifically, a configuration of discharging ink using electrostatic actuators or piezoelectric elements may be used. The contents of the structure of the printhead according to this embodiment have been described above.

Figure 2A:
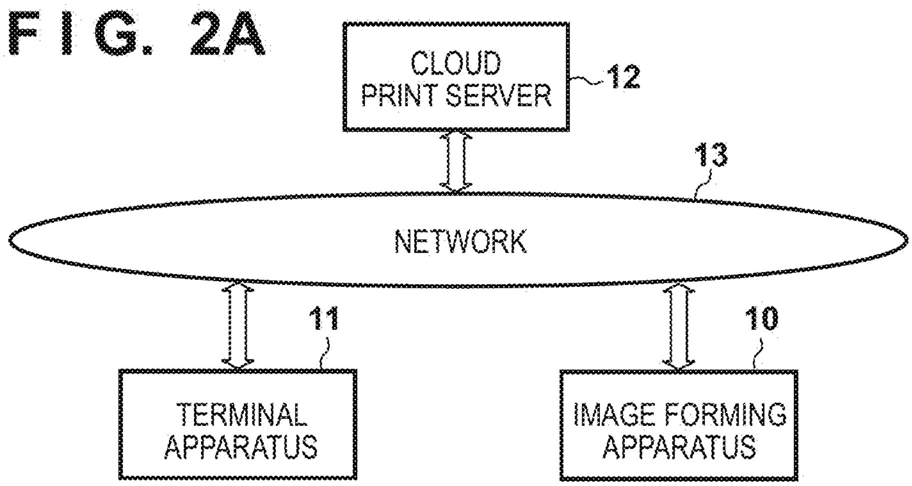
FIGS. 2A and 2B are a view and a block diagram showing a configuration including an image processing apparatus.

FIG. 2A is a view showing an example of the configuration of a printing system including an image forming apparatus 10 on which the printing apparatus 2 is mounted. As an example of the printing system, FIG. 2A shows a cloud print system in which a terminal apparatus 11, a cloud print server 12, and the image forming apparatus 10 are connected via a network 13. The cloud print server 12 is a server apparatus that provides a cloud print service. That is, in the configuration shown in FIG. 2A, the image forming apparatus 10 is a printer supporting cloud printing. The network 13 is a wired network, a wireless network, or a network including both of them. As the network 13, for example, an Internet, WAN, or VPN environment is assumed. However, the printing system is not limited to the cloud print system. For example, the network 13 may be formed as an office LAN or the terminal apparatus 11 and the image forming apparatus 10 may directly be connected without intervention of the network 13. FIG. 2A shows one terminal apparatus 11 and one image forming apparatus 10 but a plurality of terminal apparatuses 11 and a plurality of image forming apparatuses 10 may be provided. The cloud print server 12 may be a server system formed by a plurality of information processing apparatuses. The printing system may be a cloud print system in which a plurality of cloud print services cooperate with each other.

The terminal apparatus 11 is an information processing apparatus such as a PC, a tablet, or a smartphone, and a cloud printer driver for a cloud print service is installed in the terminal apparatus 11. A user can execute arbitrary application software on the terminal apparatus 11. For example, a print job is generated via the cloud printer driver based on image data generated on the print application. The print job is transmitted, via the cloud print server 12, to the image forming apparatus 10 registered in the cloud print service. The image forming apparatus 10 is a device that executes printing on a print medium such as a sheet, and prints an image on the print medium based on the received print job.

<Configuration of Control System>

Figure 2B:
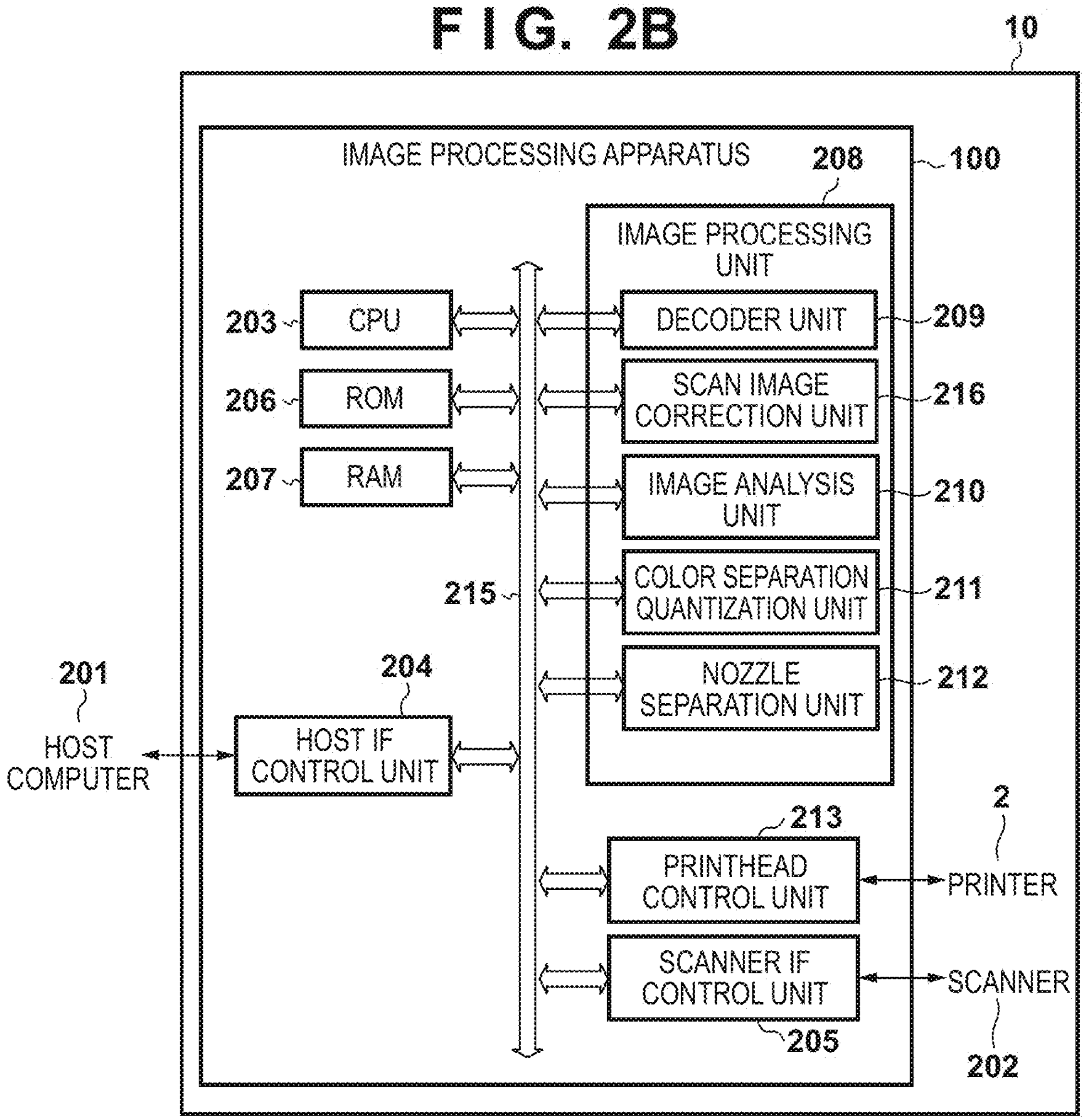

The configuration of a control system according to this embodiment will be described below with reference to FIG. 2B. FIG. 2B is a schematic block diagram of an image processing apparatus 100. This embodiment assumes that the image processing apparatus 100 is included in the image forming apparatus 10. However, the image processing apparatus 100 may be formed as an apparatus connected to the image forming apparatus 10 including the printer 2 and a scanner 202. For example, the image processing apparatus 100 may be formed in a host computer 201. In this case, the image processing apparatus 100 need not include a printhead control unit 213 or a scanner IF control unit 205.

The host computer 201 is an information processing apparatus that, for example, creates a print job including input image data and print condition information necessary for printing, and corresponds to, for example, the terminal apparatus 11 shown in FIG. 2A. Note that the print condition information is information concerning the type and size of a print sheet, print quality, and the like.

The scanner 202 is a scanner device connected to the image processing apparatus 100, and converts analog data, generated by optically reading a document placed on a scanner table, into digital data via an A/D converter. Reading by the scanner 202 is executed when the host computer 201 transmits a scan job to the image processing apparatus 100 but the present invention is not limited to this. A dedicated UI apparatus connected to the scanner 202 or the image processing apparatus 100 can substitute for the scanner 202.

A ROM 206 is a readable memory that stores a program for controlling the image processing apparatus 100. A CPU 203 controls the image processing apparatus 100 by executing the program stored in the ROM 206. A host IF control unit 204 communicates with the host computer 201, receives a print job or the like, and stores the print job in a RAM 207. The RAM 207 is a readable/writable memory used as a program execution area or a data storage area.

An image processing unit 208 generates printable nozzle data separated for each nozzle from input image data stored in the RAM 207 in accordance with a print condition included in a print job. The generated nozzle data is stored in the RAM 207. The image processing unit 208 includes a decoder unit 209, a scan image correction unit 216, an image analysis unit 210, a color separation/quantization unit 211, and a nozzle separation processing unit 212.

The printhead control unit 213 generates print data based on the nozzle data stored in the RAM 207, and controls the printhead H within the printer 2. A shared bus 215 is connected to each of the CPU 203, the host IF control unit 204, the scanner IF control unit 205, the ROM 206, the RAM 207, and the image processing unit 208. These connected units can communicate with each other via the shared bus 215. The contents of the configuration of the control system according to this embodiment have been described above.

<Overall Procedure>

Figure 3A:
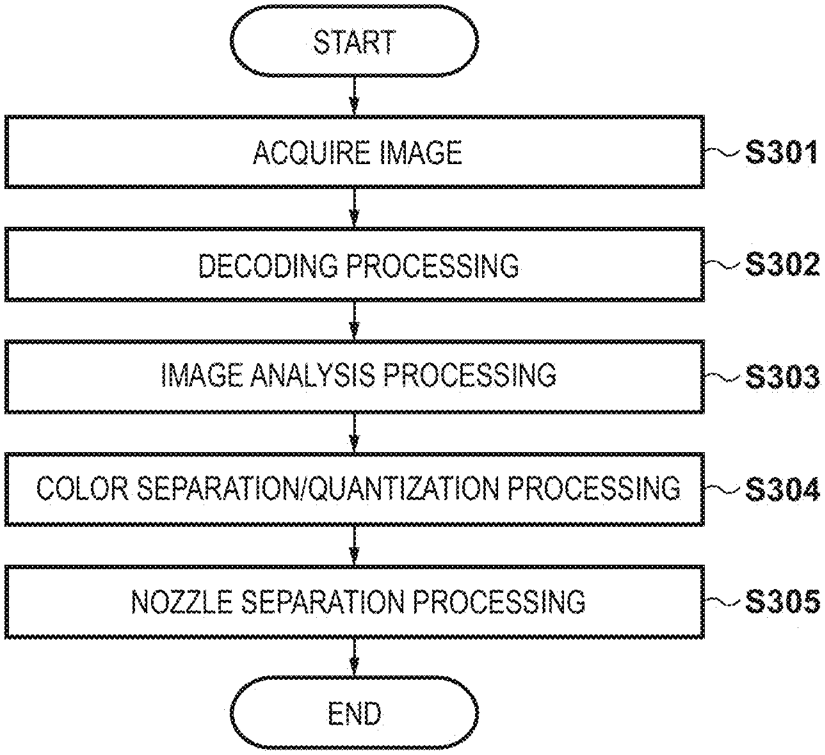
FIGS. 3A and 3B are flowcharts illustrating processing of an image processing unit.

The procedure of edge processing according to this embodiment will be described below. FIG. 3A is flowchart illustrating processing executed by the image processing unit 208 according to this embodiment. In this embodiment, with the processing shown in FIG. 3A, input image data can be converted into nozzle data.

In step S301, the image processing unit 208 acquires input image data from the RAM 207. In step S302, the decoder unit 209 performs decoding processing of the acquired input image data. The saving format of the input image data varies, and a compression format such as JPEG is generally used to decrease a communication amount between the host computer 201 and the image processing apparatus 100. In a case where the saving format is JPEG, the decoder unit 209 decodes JPEG input image data and converts it into image data (bitmap image) in a bitmap format (an information format that records an image as continuous pixel values). In a case where the host computer 201 communicates with the image processing apparatus 100 via a dedicated driver or the like, a dedicated saving format may be handled. In a case where a dedicated saving format convenient for both the driver and the image processing apparatus 100 is held, the decoder unit 209 can perform conversion into the dedicated saving format. In accordance with, for example, the characteristic of an inkjet printing apparatus, saving formats with different compression ratios can be applied to a region where information is desirably held at fine accuracy and other regions. If it is desirable to focus on image quality instead of decreasing the communication amount, the input image data may be in the bitmap format. In this case, the decoder unit 209 need only output the bitmap format intact as a conversion result.

In step S303, the image analysis unit 210 analyzes the bitmap image as a decoding result. In this embodiment, by analyzing the image, it is estimated based on a feature in the image whether a target pixel is paper white or in an end portion with a pixel formed by ink different from the target pixel. In addition, an end portion, where the target pixel exists, in a specific direction among the upper, lower, left, and right directions in an object formed by a pixel group is estimated.

Figure 3B:
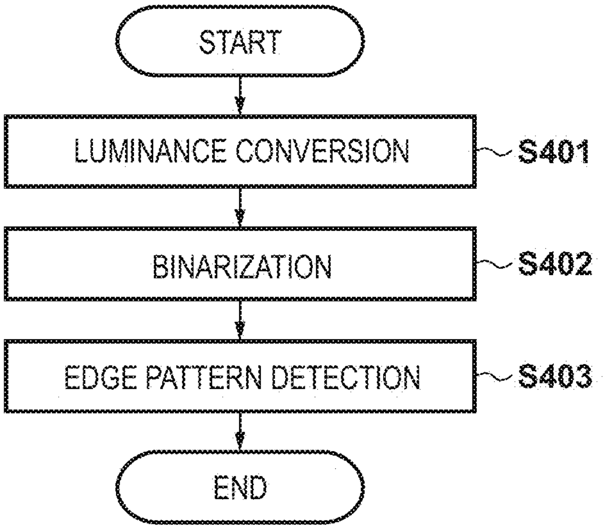

FIG. 3B shows the internal processing procedure of the image analysis processing executed in step S303. In step S401, the image analysis unit 210 converts the pixel values of the bitmap image as a decoding result into luminance values. For example, if the pixel values of the bitmap image data are pixel values (RGB values) of three channels of R, G, and B, the pixel values are converted into a pixel value (luminance value) of one channel of luminance Y. Note that if the image data transmitted from the user by the application is already represented by a luminance, the processing of step S401 need not be executed.

In step S402, the image analysis unit 210 converts data of the luminance Y into binary data for edge detection. In this embodiment, as an example, by using threshold data Th provided in advance in correspondence with a print mode of the printing apparatus, the image analysis unit 210 converts the data of the luminance Y into binary data (Bin) by conditional expression (1) below. The binary data generation expression as the conditional expression below is merely an example, and the design of an inequality condition and the form of an expression are not limited to this.

$$\text{IF}\quad Y > Th : Bin = 0 \qquad (1)$$
$$\text{else} : Bin = 1$$

In this embodiment, image analysis is executed using an index of a luminance. In the inkjet printing apparatus, a tone at which black ink is used in color separation is limited. This is because the paper surface density of black ink largely changes for each drop with respect to paper white, and thus image quality readily deteriorates in terms of graininess by frequently using black ink from a low tone. Therefore, it is easy to determine the generation position of black ink based on the luminance information of the input image, as compared with other color inks. By setting the above threshold data Th to an appropriate value, it is possible to set, in the luminance information, a luminance value corresponding to a tone from which black ink is ejected by a predetermined amount or more after ink separation. In this embodiment, it is possible to control the number and arrangement of dots of black ink and the number and arrangement of dots of other color inks adjacent to black ink, and the use of the luminance value is under the control. However, this embodiment is not limited to this. For example, color separation may be executed in advance for the analysis processing and a pixel where black ink is generated as a predetermined color component may correctly be grasped. If color separation is executed in advance, pixels where cyan, magenta, and yellow inks are generated in addition to black ink and discharge amounts of the inks can be grasped, thereby making it possible to perform more detailed analysis. The input image data may be in the CMYK format or the like instead of the RGB format, and may include information effective for analysis when it is the input image data. If the discharge amounts of cyan, magenta, and yellow inks are known, when the discharge amounts are small, color may be considered equivalent to paper white, and determination such as analysis of black ink generated in a region corresponding to paper white on the paper surface may be executed. In this embodiment, the determination is expressed by the threshold data Th. The threshold data Th may appropriately be updated in accordance with the degree of consumption of each nozzle of the nozzle arrays 1101 to 1104 of the printhead in the printing apparatus.

Figure 4A:
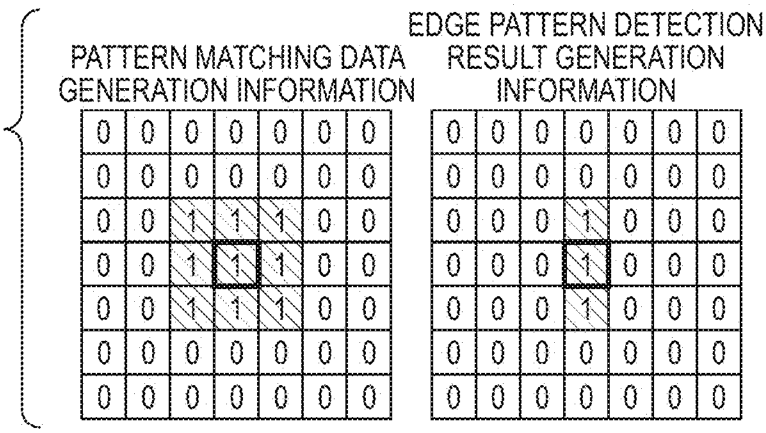
FIGS. 4A to 4C are views for explaining edge pattern detection.
Figure 4B:
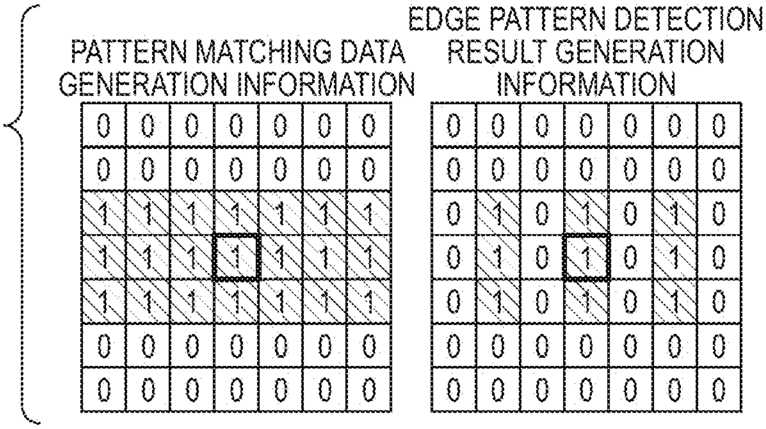

In step S403, the image analysis unit 210 executes edge pattern detection using the binary data. FIGS. 4A and 4B each show an example of pattern information for edge pattern detection. The pattern information includes two types of information, that is, "pattern matching data generation information" and "edge pattern detection result generation information". The pattern matching data generation information is obtained by executing bit AND processing for each pixel in a rectangular region of the binary data obtained in step S402. Pattern matching data obtained as a result of the bit AND processing is obtained by extracting only information necessary to detect an edge pattern from the rectangular region. The edge pattern detection result generation information is information for executing pattern matching processing for the pattern matching data. If a complete match is obtained as a result of the pattern matching processing, the rectangular region is determined as a predetermined edge pattern. The determination result is linked with the central pixel in the rectangular region.

FIG. 4A shows pattern information for determining that a target pixel is "in a left/right end portion of a 1-dot vertical line". The pattern matching data generation information is set with values so as to perform edge pattern detection for 3×3 pixels including the target pixel. A pixel added with "O" in the pattern matching data generation information is regarded as a pixel that is not considered in pattern matching regardless of how the binary data is formed. Next, the edge pattern detection result generation information corresponds to the above-described predetermined edge pattern, and is, in this example, a pattern in which only three pixels in a central vertical column among the 3×3 pixels are set with 1. This information corresponds to determination of whether the three pixels in the central vertical column have low luminance and the remaining six pixels have high luminance. If pattern matching data completely matches this pattern, it is found that there exists a high-luminance characteristic=paper white or low-density color ink at least on the left and right sides and there exists a low-luminance characteristic=black ink in the target pixel and the upper and lower pixels thereof.

FIG. 4B shows pattern information for determining that the target pixel is not only "in the left/right end portion of a 1-dot vertical line" but also "in a part of 1 dot/1 space". "1 dot/1 space" indicates a pattern in which a plurality of 1-dot vertical lines are arranged at an interval of 1 dot. By widening the range of the pattern matching data generation information to 7×3 pixels, information concerning the periphery of the 1-dot line to which the target pixel belongs can be included for determination.

Figure 4C:
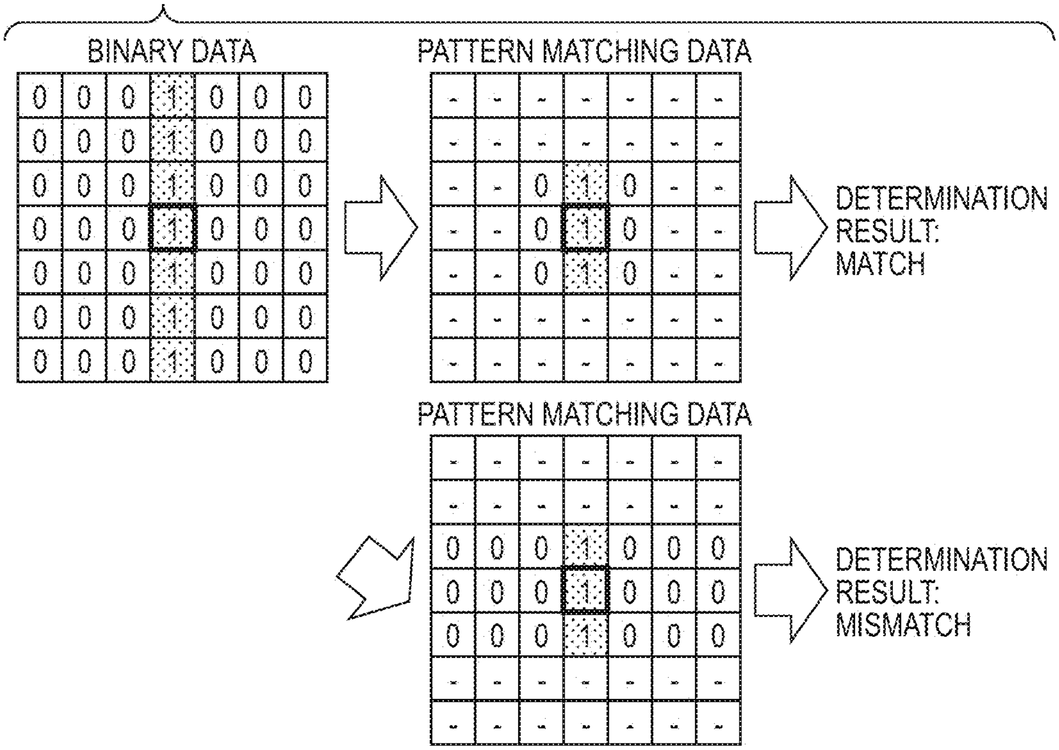

FIG. 4C shows a result of successively performing pattern matching for the binary data using FIG. 4A or 4B. When applying the pattern matching data generation information and the edge pattern detection result generation information shown in FIG. 4A to the target binary data, a determination result is determined as "match". When applying the pattern matching data generation information and the edge pattern detection result generation information shown in FIG. 4B to the target binary data, a determination result is determined as "mismatch". Based on the two pattern detection results, it is found that the target binary data is "in the left/right end portion of a 1-dot vertical line" but "not in a part of 1 dot/1 space".

Figure 5:
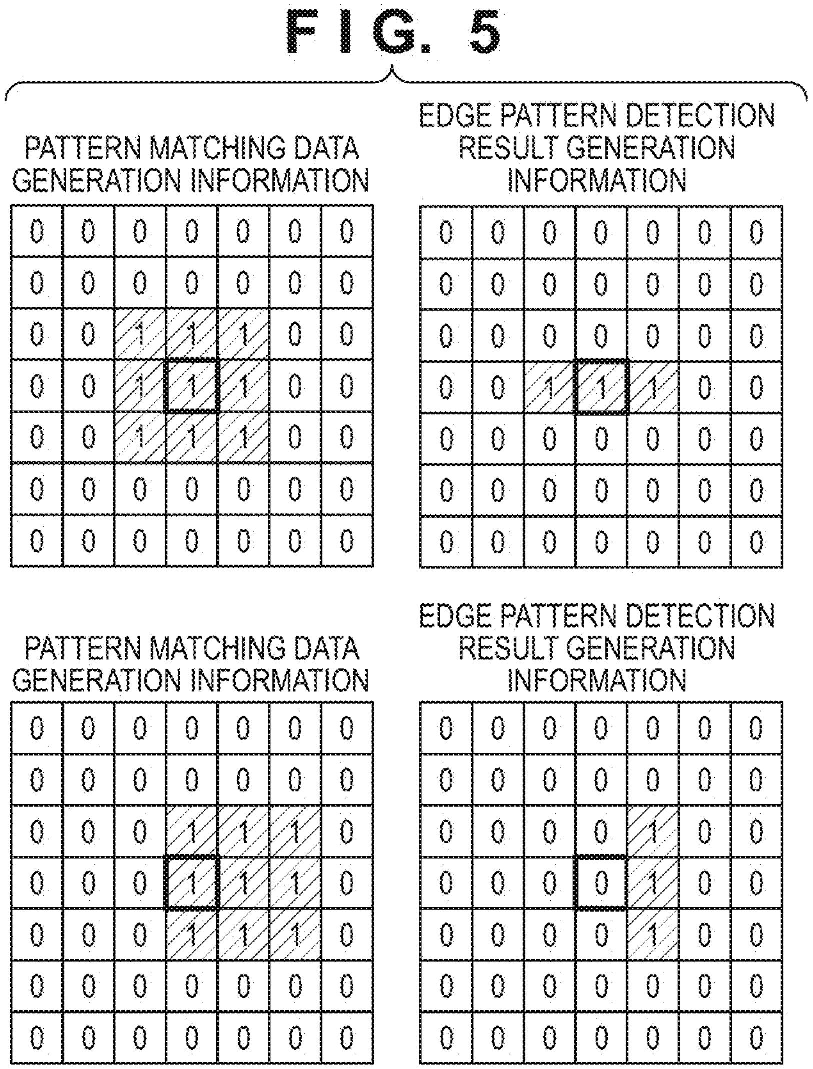
FIG. 5 is a view for explaining pattern matching.

Based on the above-described method, it is possible to detect various edge patterns. In this embodiment, 7×7 pixels are set as the target of pattern matching, but this is merely an example. If, for example, it is only necessary to be able to detect the pattern shown in FIG. 4A or 4B, 7×3 pixels suffice as the target of pattern patching. On the other hand, if it is desirable to individually detect a line shape of a 4- or more-dot line, 7×7 pixels are insufficient and a wider region may be set as a target. By widening the target range, a work memory for holding binary data to be compared and a work memory for holding pattern matching information are required more. The work memory corresponds to the RAM 207. In a case where the image analysis unit 210 is implemented as a dedicated circuit, when it is desirable to process a plurality of pixels by performing pattern matching by a parallel clock, the numbers of processing registers and processing circuits increase. Furthermore, since it is necessary to hold in advance the pattern matching information in the ROM 206 of the image processing apparatus 100, the capacity of the ROM 206 is also required. If the edge pattern is finely and diversely confirmed, more pattern matching information needs to be held, and thus it is necessary to perform design in consideration of the memory capacity and an increase in analysis time caused by an increase in number of times of comparison. Making determination of "0" in the pattern matching data generation information="not considered in pattern matching" contributes to a decrease in memory capacity and a decrease in number of times of comparison. As another configuration for decreasing the memory capacity, as shown in FIG. 5, it is also possible to perform pattern matching of another variation by processing such as rotation or phase shifting. On the upper side of FIG. 5, the pattern matching information shown in FIG. 4A is rotated by 90°, and it is possible to determine that the target pixel is "in the upper/lower end portion of a 1-dot horizontal line" using the processed pattern information. On the lower side of FIG. 5, the pattern information shown in FIG. 4A is horizontally shifted by 1 pixel, and it is possible to determine that the target pixel is "an adjacent pixel of a 1-dot vertical line" using the processed pattern matching information. In FIG. 5, variations are increased by processing the pattern matching information. However, variations can be increased by processing the binary data.

As shown in FIG. 4C, it is effective to narrow a determination result by successively applying a plurality of pieces of pattern matching information and to obtain information that is not known by individual pattern matching information. For example, when "match" with the pattern shown in FIG. 4A is determined in FIG. 4C, it may be unnecessary to perform determination with respect to a 2- or more-dot line prepared in advance. An effect of decreasing the number of times of comparison is obtained by applying only the pattern matching information for determining more detailed information of the 1-dot line, as shown in FIG. 4B. By applying FIG. 4A or 4B, it is found that the target binary data is "in the left-right end portion of a 1-dot vertical line" and "not in a part of 1 dot 1 space". Not by preparing obtainable individual pattern matching information but by deriving that information from the results of FIGS. 4A and 4B, an effect of reducing the memory capacity is obtained.

As described above, in this embodiment, it is possible to determine whether the target pixel is a pixel to undergo special processing such as processing of thinning dots or processing of changing the arrangement of dots. This processing is merely an example, and an example in a case where there are more restrictions on the memory/speed of the image processing apparatus 100 will be described later in another embodiment.

The determination result of the image analysis processing in step S303 is output in an information format suitable for processing in a subsequent step. For example, the determination result can be expressed by 3-bit multi-valued data such as non-detection (non-appropriate for any detection pattern)=0, upper end portion detection=1, lower end portion detection=2, left end portion detection=3, right end portion detection=4, and adjacent to one of end portions=5. Alternatively, expression of assignment of each bit within 5 bits is also possible, such as non-detection=00000, upper end portion detection=00001, lower end portion detection=00010, left end portion detection=00100, right end portion detection=01000, and adjacent to one of end portions=10000. The former can transmit the determination result to the next processing with a small data amount. The latter has a merit of reducing the processing load since bit processing can be used in the next processing. It has been explained that the five pieces of information are transmitted to the subsequent step. However, as described in step S303 that "the pattern matching information can diversely be expressed", information more than control information necessary for the subsequent processing steps may be detected and transmitted.

Figure 6:
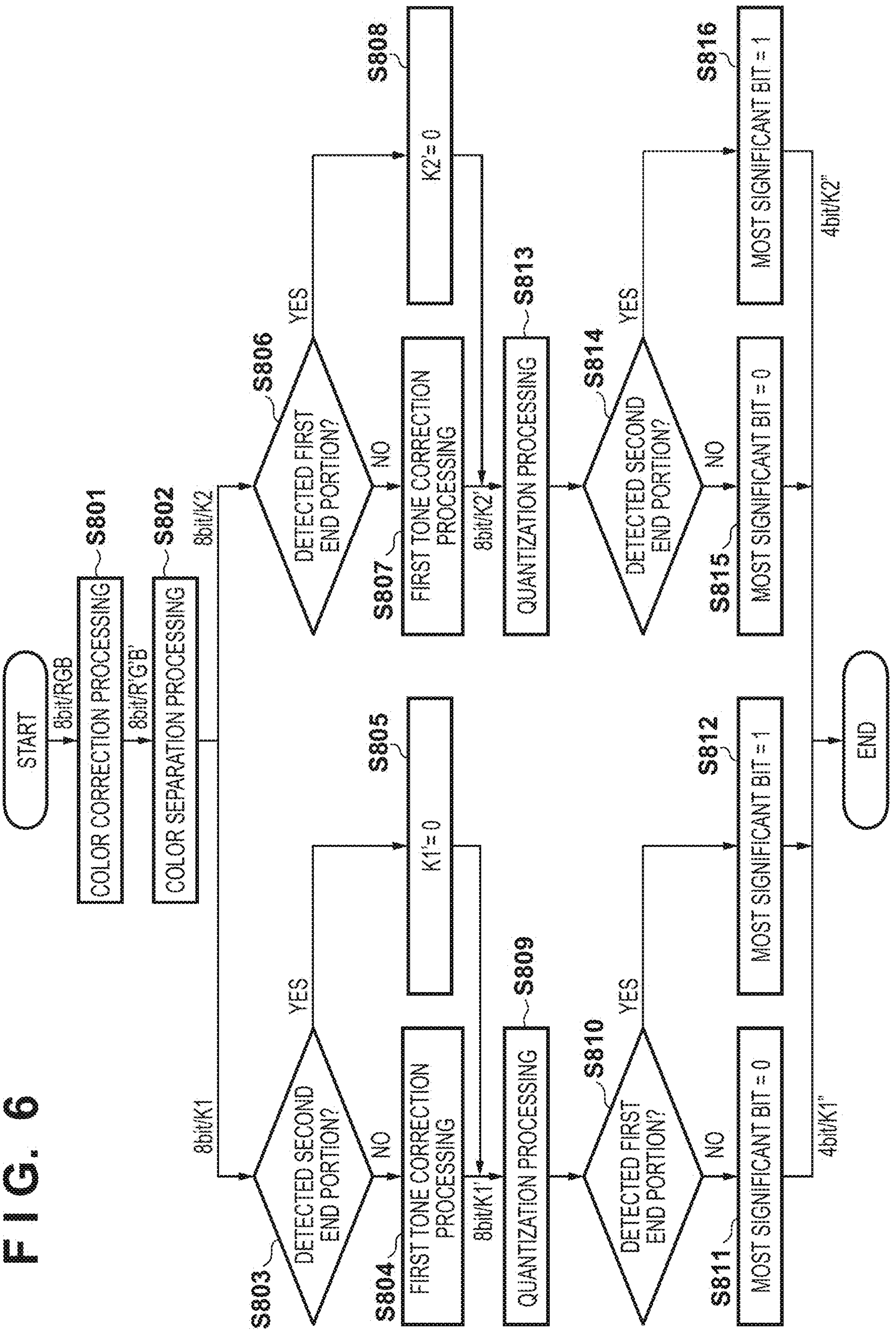
FIG. 6 is a flowchart illustrating processing of the image processing unit.

FIGS. 6 and 7A show an example of the internal processing procedure of color separation/quantization processing executed in step S304 and nozzle separation processing executed in step S305. Note that the following description assumes that the bitmap image as the decoding result of step S302 includes pixels that are arrayed at 600 dpi and each of which has an 8-bit, 256-level luminance value for each of R (red), G (green), and B (blue). In the end portion information detected in step S303, the upper end portion (first end portion), the lower end portion (second end portion), the right end portion (fourth end portion), and the left end portion (third end portion) are defined as pixels that change from 1 to 0 in Bin in the −Y direction, the +Y direction, the +X direction, and the −X direction, respectively, and are on the side of Bin=1. Since nozzles of each color of the printhead H are arranged at 1,200 dpi in the Y direction, each pixel is printed using the successive first nozzle array and second nozzle array. At this time, the nozzle located on the upper end side of each pixel is defined as an upstream side nozzle, and the nozzle located on the lower end side of each pixel is defined as a downstream side nozzle. In this embodiment, assume that the upstream side nozzle corresponds to the first nozzle and the downstream side nozzle corresponds to the second nozzle. That is, in this embodiment, the configuration has a print resolution that is twice, in the Y direction, the resolution of the image data to undergo edge pattern detection.

In color correction processing in step S801, the color separation/quantization unit 211 converts RGB data of each pixel into R'G'B' data expressed in a color space unique to the printing apparatus. As a detailed conversion method, for example, conversion can be performed by referring to a lookup table stored in advance in the memory.

In step S802, the color separation/quantization unit 211 performs color separation processing for the R'G'B' data. More specifically, with reference to a lookup table stored in advance in the memory, the luminance values R', G', and B' of each pixel are converted into 8-bit, 256-level density values C, M, Y, and K corresponding to ink colors used by the printing apparatus. Furthermore, the color separation/quantization unit 211 copies the density value data of one or more colors of C, M, Y, and K, thereby generating two coincident data in total. For the sake of simplicity, an example of generating black data K1 and K2 will be described. Note that K1 and K2 are adopted to the first nozzle array and the second nozzle array of the nozzle array 1101, respectively, by processing (to be described later).

In steps S803 to S805, the color separation/quantization unit 211 performs different tone correction processing based on whether the processed pixel is in the second end portion using the density value K1 and the result determined in step S303. In steps S806 to S808, the color separation/quantization unit 211 performs different tone correction processing based on whether the processed pixel is in the first end portion using the density value K2 and the result determined in step S303. The tone correction processing is such correction that the input density value and an optical density expressed by the print medium P have a linear relationship. This correction processing converts the 8-bit, 256-level density values K1 and K2 into 8-bit, 256-level density values K1' and K2'. If it is detected in step S303 that the pixel is in the second end portion, the density value K1 is converted into K1'=0 in step S805; otherwise, the density value K1 is converted into K1' by the first tone correction processing in step S804. On the other hand, if it is detected in step S303 that the pixel is in the first end portion, the density value K2 is converted into K2'=0 in step S808; otherwise, the density value K2 is converted into K2' by the first tone correction processing in step S807. FIGS. 7B and 7C are a table and a graph showing an example of setting of the first tone correction processing, in which In corresponds to the density values K1 and K2 and Out corresponds to the density values K1' and K2'. In this description, for the sake of simplicity, an example in which In and Out have a linear relationship is shown.

In step S809, the color separation/quantization unit 211 performs predetermined quantization processing for the density value K1' to convert it into 4-bit 3-valued quantization data (quantization value) of "0000", "0001", and "0010". In this example, three values of a low density, an intermediate density, and a high density are expressed. Furthermore, in steps S810 to S812, the color separation/quantization unit 211 sets a value in the most significant bit based on whether the processed pixel is in the first end portion using the result determined in step S303, and outputs 4-bit quantization data K1". More specifically, if it is detected that the pixel is in the first end portion, the most significant bit=1 is set in step S812; otherwise, the most significant bit=0 is set in step S811. Similarly, in step S813, the color separation/quantization unit 211 performs predetermined quantization processing for the density value K2' to convert it into 4-bit 3-valued quantization data of "0000", "0001", and "0010". In this example, three values of a low density, an intermediate density, and a high density are expressed. Furthermore, in steps S814 to S816, the color separation/quantization unit 211 sets a value in the most significant bit based on whether the processed pixel is in the second end portion using the result determined in step S303, and outputs 4-bit quantization data K2". More specifically, if it is detected that the pixel is in the second end portion, the most significant bit=1 is set in step S816; otherwise, the most significant bit=0 is set in step S815.

In step S305, the nozzle separation processing unit 212 performs index expansion processing for the quantization data K1" and K2" output in step S304. In the index expansion processing of this embodiment, the quantization data K1" and K2" of 600×600 dpi are converted into binary nozzle data K1*p* and K2*p* of 600×600 dpi using an index pattern prepared in advance. The quantization data K1" is converted into the nozzle data K1*p* by the first index expansion processing in step S817 of FIG. 7A, and the quantization data K2" is converted into the nozzle data K2*p* by the second index expansion processing in step S818. In other words, the index pattern is a dot arrangement pattern for arranging dots in pixels.

Figures 8A, 8B, 8C, 8D:
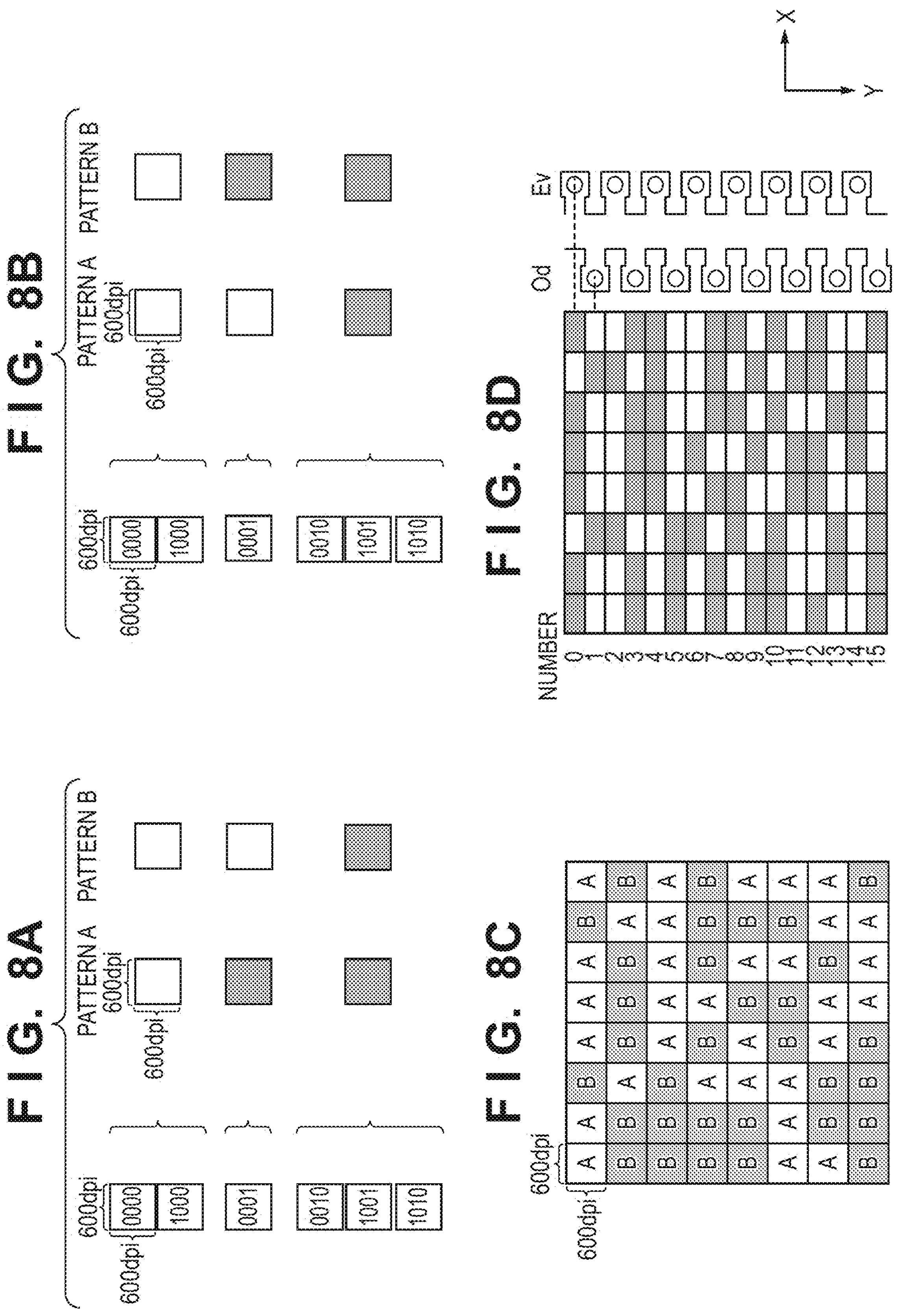
FIGS. 8A to 8D are views for explaining index expansion processing.

FIGS. 8A to 8D are views showing examples of the dot arrangement pattern used in the index expansion processing and a reference index pattern. The upper side of each of FIGS. 8A to 8D is a side on which the printing apparatus discharges a print medium. FIG. 8A is a view showing the dot arrangement pattern of the first index expansion processing. If the quantization data K1" of one pixel of 600 dpi×600 dpi indicates "0000" or "1000", no dot is surely arranged in this pixel. If the quantization data K1" indicates "0001", pattern A in which a dot is arranged and pattern B in which no dot is arranged are prepared. If the quantization data K1" indicates "0010", "1001", or "1010", a dot is surely arranged in the pixel. FIG. 8B is a view showing the dot arrangement pattern of the second index expansion processing. If the quantization data K2" of one pixel of 600 dpi×600 dpi indicates "0001", pattern A in which no dot is arranged and pattern B in which a dot is arranged are prepared. If the quantization data K2" indicates "0000", "1000", "0010", "1001", or "1010", the same processing as that in the first index expansion processing is performed. FIG. 8C is a view showing an example of the reference index pattern. In this embodiment, different index patterns are respectively used in the first index expansion processing in step S817 and the second index expansion processing in step S818 but each pattern is created with reference to the reference index pattern shown in FIG. 8C. In the reference index pattern, each rectangle corresponds to one pixel region of 600 dpi×600 dpi, and it is determined, for each pixel, which of patterns A and B is to be used to arrange a dot. The nozzle separation processing unit 212 generates, as data for the first nozzle array of the nozzle array 1101 corresponding to each pixel, the nozzle data K1*p* of each pixel after the first index expansion processing, and stores the data in the RAM 207. Furthermore, the nozzle separation processing unit 212 generates, as data for the second nozzle array of the nozzle array 1101 corresponding to each pixel, the nozzle data K2*p* of each pixel after the second index expansion processing, and stores the data in the RAM 207. FIG. 8D shows the binary data of 600 dpi in the X direction and 1,200 dpi in the Y direction after the index expansion processing, and the positional relationship between the data and the nozzles of the nozzle array 1101 in a case where all the quantization data of the respective pixels uniformly indicate "0001" (intermediate density). As shown in FIG. 8D, dots are formed by the nozzles (first nozzles) of the first nozzle array for the 0th, second, fourth, . . . data of the data in the Y direction, and dots are formed by the nozzles (second nozzles) of the second nozzle array for the first, third, fifth, . . . data. Thus, printing/non-printing of each nozzle of the nozzle array 1101 is set for each pixel of the input image data of 600 dpi×600 dpi, thereby setting printing/non-printing of 600 dpi×1200 dpi. The thus generated data will be referred to as print data hereinafter. The contents of the procedure of the edge processing according to this embodiment have been described above.

<Modification of Color Separation/Quantization Unit and Nozzle Separation Processing Unit>

To implement this embodiment, the processing of the color separation/quantization unit 211 and the nozzle separation processing unit 212 is not limited to the example shown in FIGS. 6 to 8D. For example, an example of the setting of the index expansion processing shown in each of FIGS. 8A and 8B shows a dot arrangement pattern and a so-called 1-bit index pattern whose dot arrangement information is equivalent to that of nozzle data but the present invention is not limited to this example. For example, with respect to the dot arrangement pattern of one pixel, a pixel in which no dot is arranged is set with "00". A pixel in which a dot is arranged may be expressed by 2 bits, for example, "01" in a case where the most significant bit of the quantization data is "0", or "10" in a case where the most significant bit of the quantization data is "1". Furthermore, the nozzle separation processing unit 212 may generate nozzle data K1*p*' and K2*p*' equivalent to the dot arrangement condition by multiplying the nozzle data K1*p* and K2*p*, generated based on the above dot arrangement pattern, by a mask pattern. The mask pattern is obtained by expressing, by 2 bits, one pixel stored in the ROM 206 or the RAM 207. For example, in a case where the nozzle data K1*p* is "00", K1*p*'=0 is set even for any mask pattern, thereby obtaining the same dot arrangement condition as in this embodiment. Furthermore, K1*p*'=1 is set using the mask pattern "01" or "11" in a case where the nozzle data K1*p* is "01" or the mask pattern "10" or "11" in a case where K1*p* is "10", and the predetermined mask pattern is applied, thereby obtaining the same dot arrangement condition as in this embodiment. The nozzle data K2*p* is the same as K1*p*. FIG. 6 shows an example in which each of the density value K1 referred to by the first nozzle array and the density value K2 referred to by the second nozzle array is processed but processing shown in FIGS. 20A to 21 may be performed.

Figure 20B:
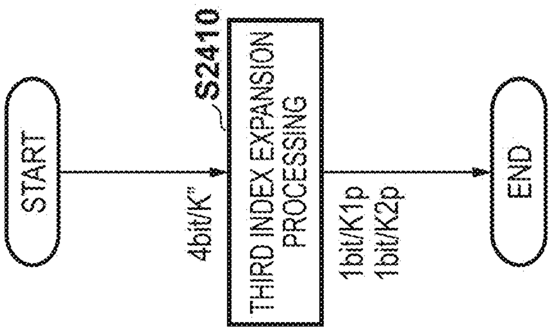
FIGS. 20A and 20B are flowcharts illustrating a modification of FIG. 6.
Figure 20A:
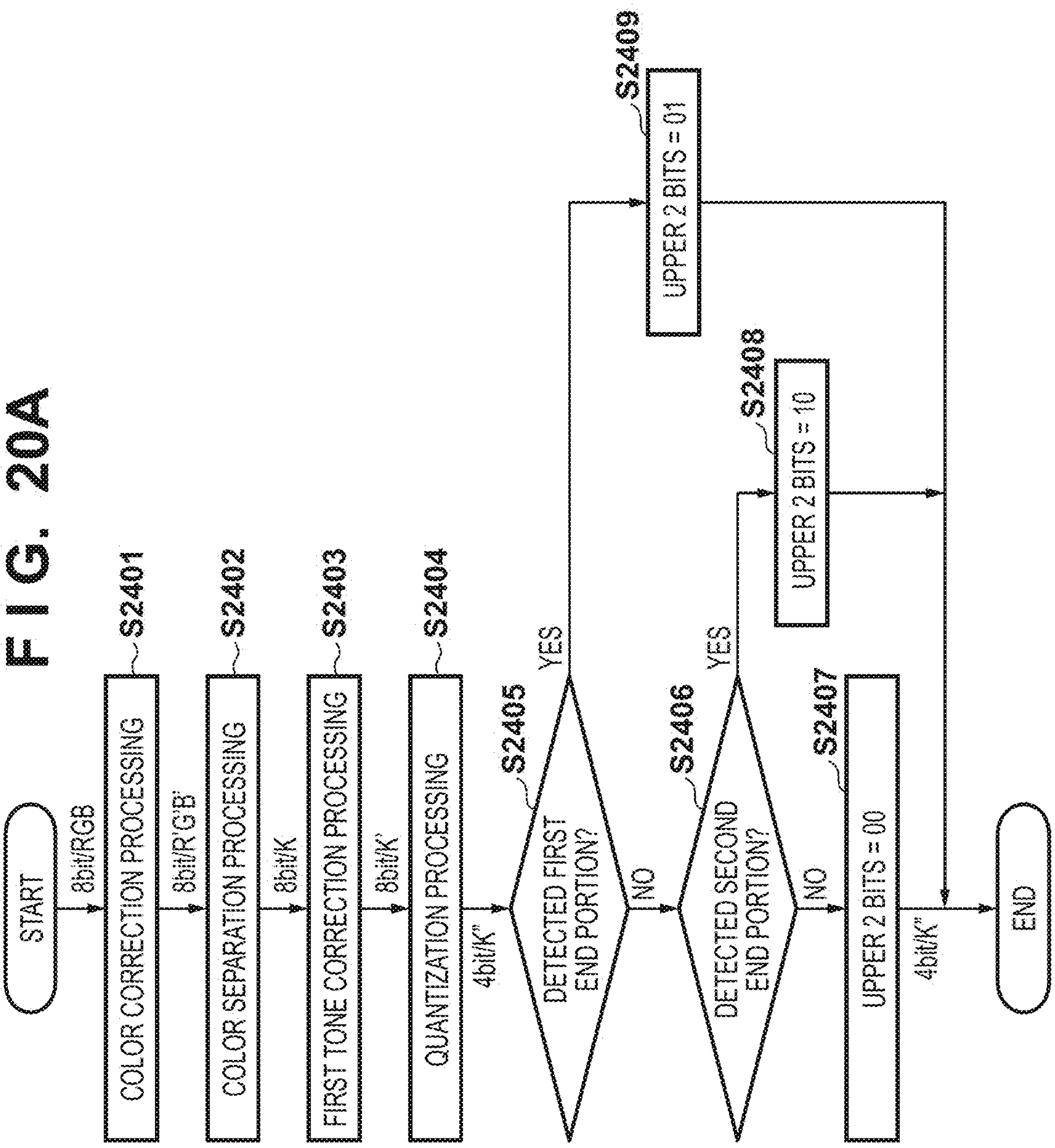

FIGS. 20A and 20B are flowcharts illustrating a modification of FIG. 6. Step S2401 is the same as step S801 and a description thereof will be omitted. In step S2402, the color separation/quantization unit 211 performs color separation processing for the R'G'B' data to convert it into density values C, M, Y, and K. The conversion method is the same as in step S802. However, unlike step S802, processing of copying the density value data is not performed. For the sake of simplicity, an example of processing of the black data K will be described.

In step S2403, the color separation/quantization unit 211 performs tone correction processing for the density value K to convert it into the density value K'. The method of the tone correction processing is the same as in step S804 or S807 and a description thereof will be omitted.

In step S2404, the color separation/quantization unit 211 performs predetermined quantization processing for the density value K' to convert it into 4-bit 3-valued quantization data of "0000", "0001", and "0010". Furthermore, in step S2405 to S2409, the color separation/quantization unit 211 sets a value in upper 2 bits based on the end portion information of the processed pixel using the result determined in step S303, and outputs 4-bit quantization data K". If it is detected that the pixel is in the first end portion, upper 2 bits=01 is set in step S2409. If it is determined that the pixel is not in the first end portion but in the second end portion, upper 2 bits=10 is set in step S2408. If it is detected that the pixel is in neither the first end portion nor the second end portion, upper 2 bits=00 is set in step S2407.

In step S2410, the nozzle separation processing unit 212 performs index expansion processing for the quantization data K" output in step S304. In the index expansion processing in this example, the quantization data K" of 600×600 dpi is converted into the binary nozzle data K1*p* and K2*p* of 600 dpi×600 dpi using the index pattern prepared in advance.

Figure 21:
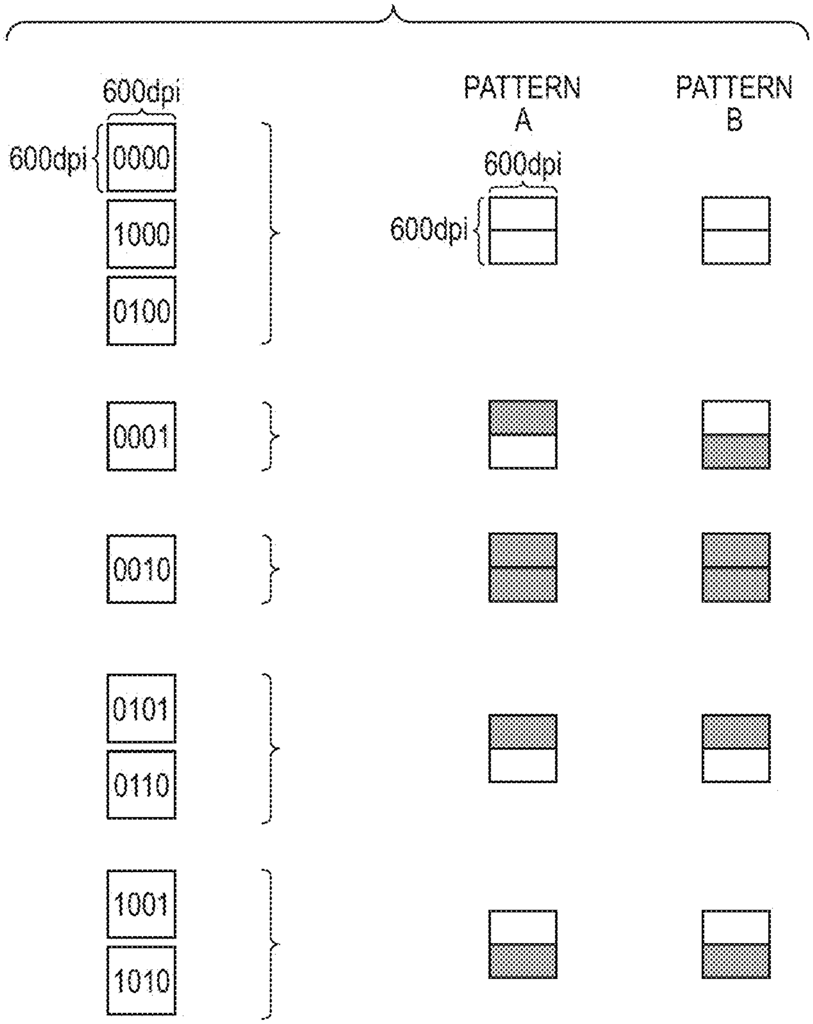
FIG. 21 is a view showing an example of a dot arrangement pattern used in index expansion processing.

FIG. 21 is a view showing an example of the dot arrangement pattern used in the index expansion processing. The dot arrangement pattern shown in FIG. 21 is obtained by vertically connecting pieces of arrangement information of 600 dpi×1200 dpi. If the quantization data K" indicates "0000", "0100", or "1000", no dots are arranged on the upper and lower sides of this pixel. If the quantization data K" indicates "0001", pattern A in which a dot is arranged on the upper side and pattern B in which a dot is arranged on the lower side are prepared. If the quantization data K" indicates "0010", dots are surely arranged on both the upper and lower sides of the pixel. If the quantization data K" indicates "0101" or "0110", a dot is surely arranged on the upper side of the pixel and no dot is surely arranged on the lower side of the pixel. If the quantization data K" indicates "1001" or "1010", a dot is surely arranged on the lower side of the pixel and no dot is surely arranged on the upper side of the pixel. The reference index pattern is the same as in FIG. 8C. Then, the nozzle separation processing unit 212 generates data of the upper side among the pieces of arrangement information of the upper and lower sides of each pixel as data for the first nozzle array of the nozzle array 1101 corresponding to each pixel, which is the nozzle data K1*p*, and stores the data in the RAM 207. Furthermore, the nozzle separation processing unit 212 generates data of the lower side of the composite nozzle data Kp of each pixel as data for the second nozzle array of the nozzle array 1101 corresponding to each pixel, which is the nozzle data K2*p*, and stores the data in the RAM 207.

With the above procedure, data printed by each nozzle is obtained as in the procedure shown in FIGS. 6 to 8D, and the same effect can be obtained. More specifically, for example, in a case of "0110" indicating the upper end portion, no dot is surely arranged on the lower side of the pixel, and in a case of "1010" indicating the lower end portion, no dot is surely arranged on the upper side of the pixel. The contents concerning the modification of the color separation/quantization unit and the nozzle separation processing unit according to this embodiment have been described above.

<Processing at Time of Shifting Nozzles to be Used>

This embodiment has explained the example in which the upstream side nozzle of each pixel is the first nozzle and the downstream side nozzle is the second nozzle but this is merely an example. For example, for the purpose of correcting a physical positional shift in the Y direction that can occur between the black nozzle array 1101 and each of the remaining color nozzle arrays 1102 to 1104, the black nozzle may be shifted in the Y direction by 1200 dpi×odd number with respect to the input image, thereby executing printing. In this case, the Ev nozzle and the Od nozzle to be used may be exchanged (the Ev nozzle is used for the 0th, second, fourth, . . . data in the Y direction and the Od nozzle is used for the first, third, fifth, . . . data in the Y direction). In step S305, the nozzle separation processing unit 212 generates the nozzle data K1*p* as data for the second nozzle of the nozzle array 1101 and generates K2*p* as data for the first nozzle of the nozzle array 1101, thereby making it possible to obtain the same effect. The contents of the processing at the time of shifting nozzles to be used according to this embodiment have been described above.

<Processing of Nozzle Arrays Other than Black Nozzle Array>

This embodiment has explained the processing of step S803 and the subsequent steps with respect to only the black data. However, in step S802, data other than the black data, that is, the density value data of cyan, magenta, and yellow are also output. The same processing as that for the black data is performed for these data. Alternatively, processing different from that for the black data may be used, as will be described below.

FIGS. 10A to 10D show an example of the internal processing procedure of the color separation/quantization processing executed in step S304 and the nozzle separation processing executed in step S305 with respect to cyan, magenta, and yellow. Steps S1201 and S1202 are the same as steps S801 and S802, respectively. In addition, steps S1203 and S1204 are the same as steps S804 and S809, respectively, and a description thereof will be omitted.

In step S1205, the color separation/quantization unit 211 outputs 4-bit quantization data C", M", and Y" based on whether the processed pixel is a pixel adjacent to a specific end portion using the result determined in step S303. The specific end portion is, for example, the first end portion or the second end portion. More specifically, if it is detected that the pixel is a pixel adjacent to the specific end portion, the most significant bit of the quantization data=1 is set in step S1207; otherwise, the most significant bit of the quantization data=0 is set in step S1206.

In step S1208, the nozzle separation processing unit 212 performs index expansion processing for each of the quantization data C", M", and Y" output in step S304. In the index expansion processing in this example, the quantization data C", M", and Y" of 600 dpi×600 dpi are converted into binary nozzle data C1*p*, C2*p*, M1*p*, M2*p*, Y1*p*, and Y2*p* of 600 dpi×600 dpi using the index pattern prepared in advance.

Figure 10A:
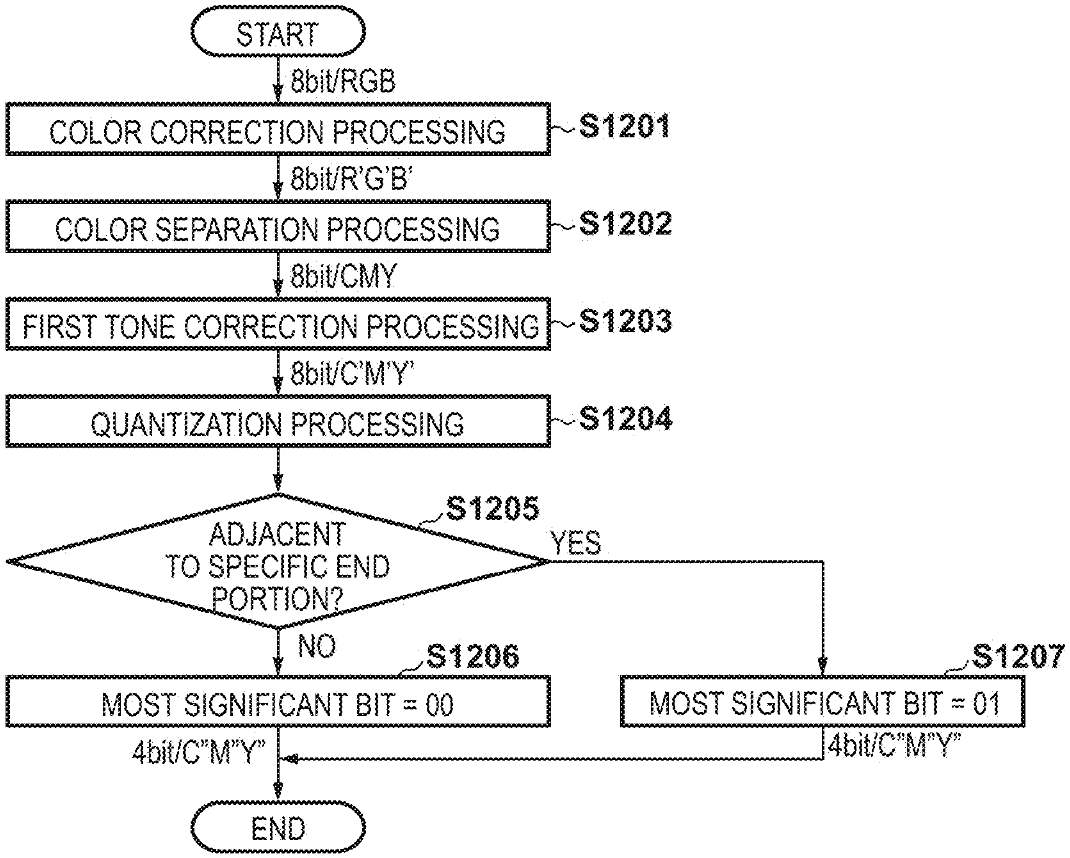
FIGS. 10A to 10D are flowcharts and views showing processing of the image processing unit.
Figure 10B:
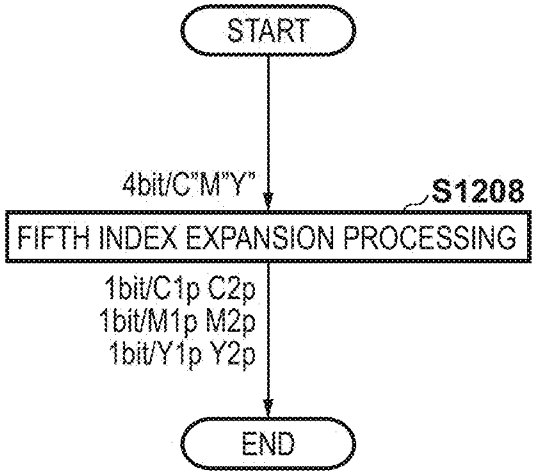
Figure 10C:
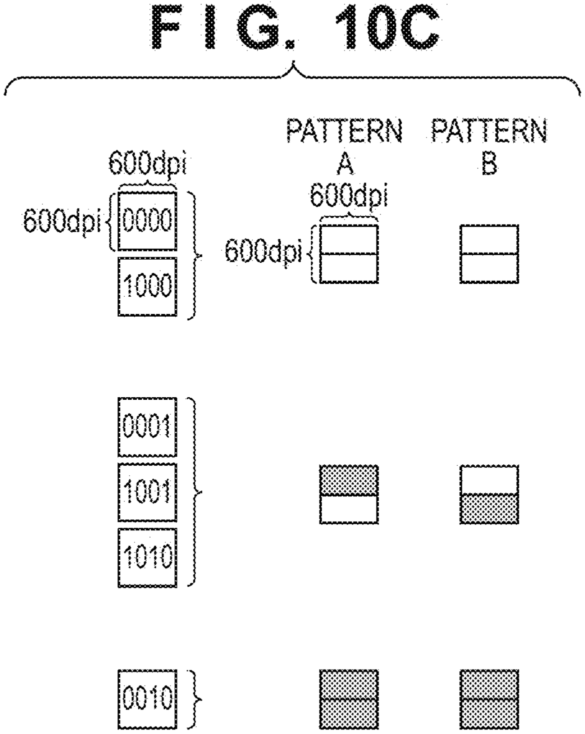
Figure 10D:
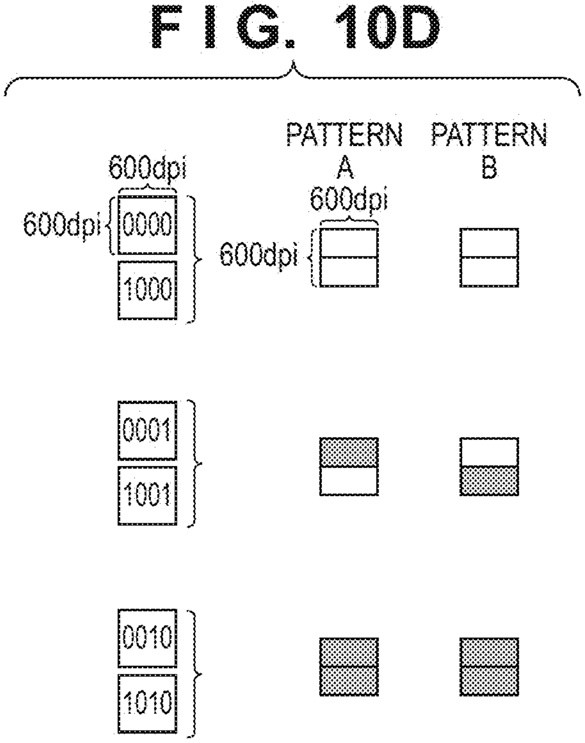

FIGS. 10C and 10D are views each showing an example of a dot arrangement pattern used in the index expansion processing. FIG. 10C shows an arrangement pattern for Y", and FIG. 10D shows an arrangement pattern for C" and M". Each of the dot arrangement patterns shown in FIGS. 10C and 10D is obtained by vertically connecting pieces of arrangement information of 600 dpi×1200 dpi. In a case where "0000" or "1000" is indicated for each of the quantization data C", M", and Y", no dot of the corresponding color is arranged on either the upper side or the lower side of the pixel. In a case where "0001" is indicated for each of the quantization data C", M", and Y", pattern A in which a dot of the corresponding color is arranged on the upper side and pattern B in which a dot of the corresponding color is arranged on the lower side are prepared. In a case where "0010" is indicated for each of the quantization data C", M", and Y", a dot of the corresponding color is surely arranged on each of the upper side and the lower side of the pixel. With respect to each of the quantization data C" and M", even in a case where "1010" is indicated, a dot of the corresponding color is surely arranged on each of the upper side and the lower side of the pixel. On the other hand, if "1010" is indicated for the quantization data Y", pattern A in which a dot of the corresponding color is arranged on the upper side and pattern B in which a dot of the corresponding color is arranged on the lower side are prepared. A reference index pattern is the same as in FIG. 8C. Then, the nozzle separation processing unit 212 generates data of the upper side among the pieces of arrangement information of the upper and lower sides of a cyan dot of each pixel as data for the first nozzle of the cyan nozzle array 1102 corresponding to each pixel, which is the nozzle data C1*p*, and stores the data in the RAM 207. Furthermore, the nozzle separation processing unit 212 generates data of the lower side among the pieces of arrangement information of the upper and lower sides of a cyan dot of each pixel as data for the second nozzle of the cyan nozzle array 1102 corresponding to each pixel, which is the nozzle data C2*p*, and stores the data in the RAM 207. The same applies to magenta and yellow. As described above, with respect to cyan and magenta, the same dot arrangement is obtained regardless of whether the pixel is adjacent to the specific end portion, and thus dots are not thinned. On the other hand, with respect to yellow, in a case where the pixel is adjacent to the specific end portion, dots are thinned. It has been described with respect to yellow that dots are thinned in a case where the pixel is adjacent to the specific end portion, but without limitation to yellow, with respect to cyan or magenta as well, dots may be thinned in a case where the pixel is adjacent to the specific end portion. The processing for nozzle arrays other than the black nozzle array has been explained above. Note that this description is common to all embodiments.

<Flight Characteristic of Main Droplet and Satellites Depending on Scanning Direction>

FIGS. 11A to 11H are views for explaining an example of the flight characteristic of a main droplet and satellites of ink discharged from a nozzle arrayed in the first nozzle array mounted on the printhead used in this embodiment.

Figure 11A:
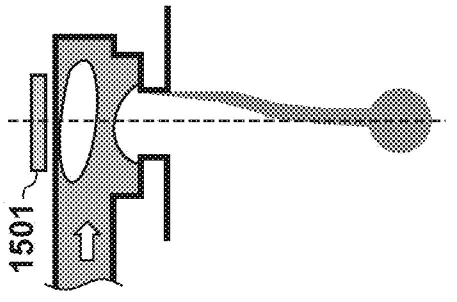
FIGS. 11A to 11H are views for explaining an example of the flight characteristic of a main droplet and satellites of ink discharged from a nozzle arrayed in a first nozzle array.

FIG. 11A is a sectional view of a nozzle included in the first nozzle array, in which ink is supplied through a common ink channel on the left side of FIG. 11A from an ink tank storing ink. An ink droplet is discharged by the pressure of a bubble generated by heating a heating element 1501. At this time, there is a discharge characteristic that if flow resistance in the right direction in FIG. 11A is strong, asymmetry in the ink channel direction occurs to cause the meniscus shape or the shape of a bubble at the time of defoaming to be asymmetrical and tailing is bent to a far side from the ink channel on the left side.

Figure 11B:
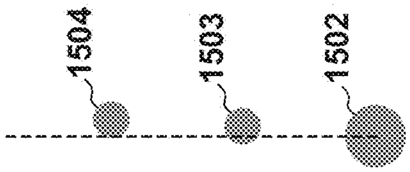

FIG. 11B shows the flight characteristic of a main droplet and satellites of an ink droplet discharged from the nozzle described with reference to FIG. 11A. Since tailing is bent to the opposite side of the ink channel on the left side in FIG. 11A, the centers of satellites 1503 and 1504 are deviated rightward in FIG. 11B with respect to the center of a main droplet 1502.

Figure 11C:
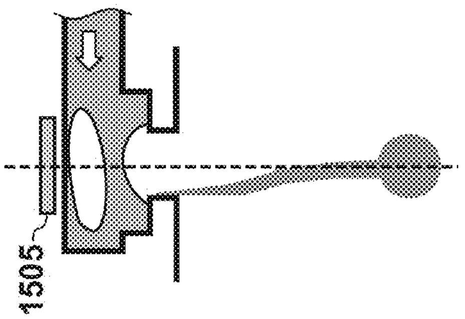

FIG. 11C is a sectional view of a nozzle included in the second nozzle array, in which ink is supplied through a common ink channel on the right side from an ink tank storing ink. An ink droplet is discharged by the pressure of a bubble generated by heating a heating element 1505. At this time, there is a discharge characteristic that if flow resistance in the left direction in FIG. 11C is strong, asymmetry in the ink channel direction occurs to cause the meniscus shape or the shape of a bubble at the time of defoaming to be asymmetrical and tailing is bent to a far side from the ink channel on the right side.

Figure 11D:
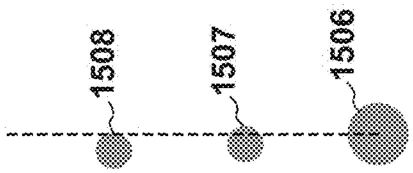

FIG. 11D shows the flight characteristic of a main droplet and satellites of an ink droplet discharged from the nozzle described with reference to FIG. 11C. Since tailing is bent to the opposite side of the ink channel on the right side in FIG. 11C, the centers of satellites 1507 and 1508 are deviated leftward in FIG. 11D with respect to the center of a main droplet 1506. The above characteristic will be referred to as the first ink droplet flight characteristic hereinafter.

Figure 11E:
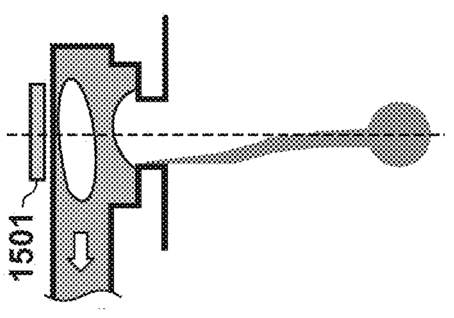

FIG. 11E is a sectional view of the nozzle included in the first nozzle array, in which ink is supplied through the common ink channel on the left side from the ink tank storing ink. An ink droplet is discharged by the pressure of a bubble generated by heating the heating element 1501. At this time, there is a discharge characteristic that if flow resistance in the left direction in FIG. 11E is strong, asymmetry in the ink channel direction occurs to cause the meniscus shape or the shape of a bubble at the time of defoaming to be asymmetrical and tailing is bent in the ink channel direction on the left side.

Figure 11F:
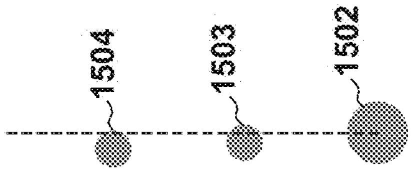

FIG. 11F shows the flight characteristic of a main droplet and satellites of an ink droplet discharged from the nozzle described with reference to FIG. 11E. Since tailing is bent in the ink channel direction on the left side in FIG. 11E, the centers of the satellites 1503 and 1504 are deviated leftward in FIG. 11F with respect to the center of the main droplet 1502.

Figure 11G:
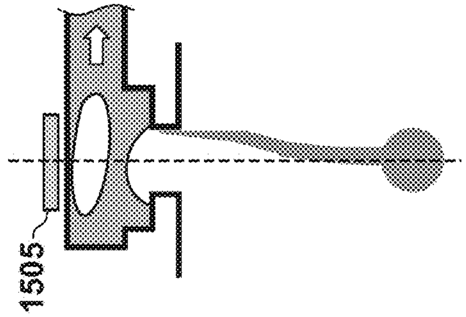

FIG. 11G is a sectional view of the nozzle included in the second nozzle array, in which ink is supplied through the common ink channel on the right side from the ink tank storing ink. An ink droplet is discharged by the pressure of a bubble generated by heating the heating element 1505. At this time, there is a discharge characteristic that if flow resistance in the right direction in FIG. 11G is strong, asymmetry in the ink channel direction occurs to cause the meniscus shape or the shape of a bubble at the time of defoaming to be asymmetrical and tailing is bent in the ink channel direction on the right side.

Figure 11H:
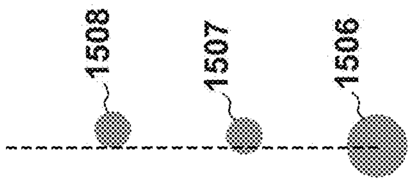

FIG. 11H shows the flight characteristic of a main droplet and satellites of an ink droplet discharged from the nozzle described with reference to FIG. 11G. Since tailing is bent in the ink channel direction on the right side in FIG. 11G, the centers of the satellites 1507 and 1508 are deviated rightward in FIG. 11H with respect to the center of the main droplet 1506. The above flight characteristic will be referred to as the second ink droplet flight characteristic different from the first ink droplet flight characteristic hereinafter.

The flight characteristic of the main droplet and satellites depending on the scanning direction of the carriage has been described above. As in this example, even if the flight characteristic of the main droplet and the satellites is not symmetrical in accordance with the scanning direction of the carriage, the flight distance of the main droplet need only be different from the flight distance of the satellite between the first scanning direction and the second scanning direction as a scanning direction reverse to the first scanning direction. In addition, the present invention is not limited to the above-described difference in flight characteristic of the main droplet and the satellites caused by the nozzle structure. For example, the flight characteristic of the main droplet and the satellites may be different between a front nozzle array and a rear nozzle array in the advancing direction of the carriage due to the influence of an air flow (not shown) generated by ink discharge and carriage scanning. This embodiment will exemplify a printhead having the above-described first ink droplet flight characteristic.

FIGS. 12A to 12H are views schematically showing a state in which when discharge from the nozzle of the first nozzle array group has the flight characteristic of the main droplet and the satellites shown in FIG. 11B, the main droplet 1502 and the satellites 1503 and 1504 land on the print medium in accordance with the scanning direction of the carriage. In FIGS. 12A to 12H, an arrow indicating the horizontal direction represents a force applied in the scanning direction of the carriage, and an arrow in the downward direction represents a force applied by ink discharge. In the case of the first scanning direction in which the carriage advances rightward in FIGS. 12A to 12D, the lapse of time until the main droplet and the satellites land is shown in time series in the order of FIGS. 12A, 12B, 12C, and 12D.

Figures 12A, 12B, 12C, 12D, 12E, 12F, 12G, 12H:
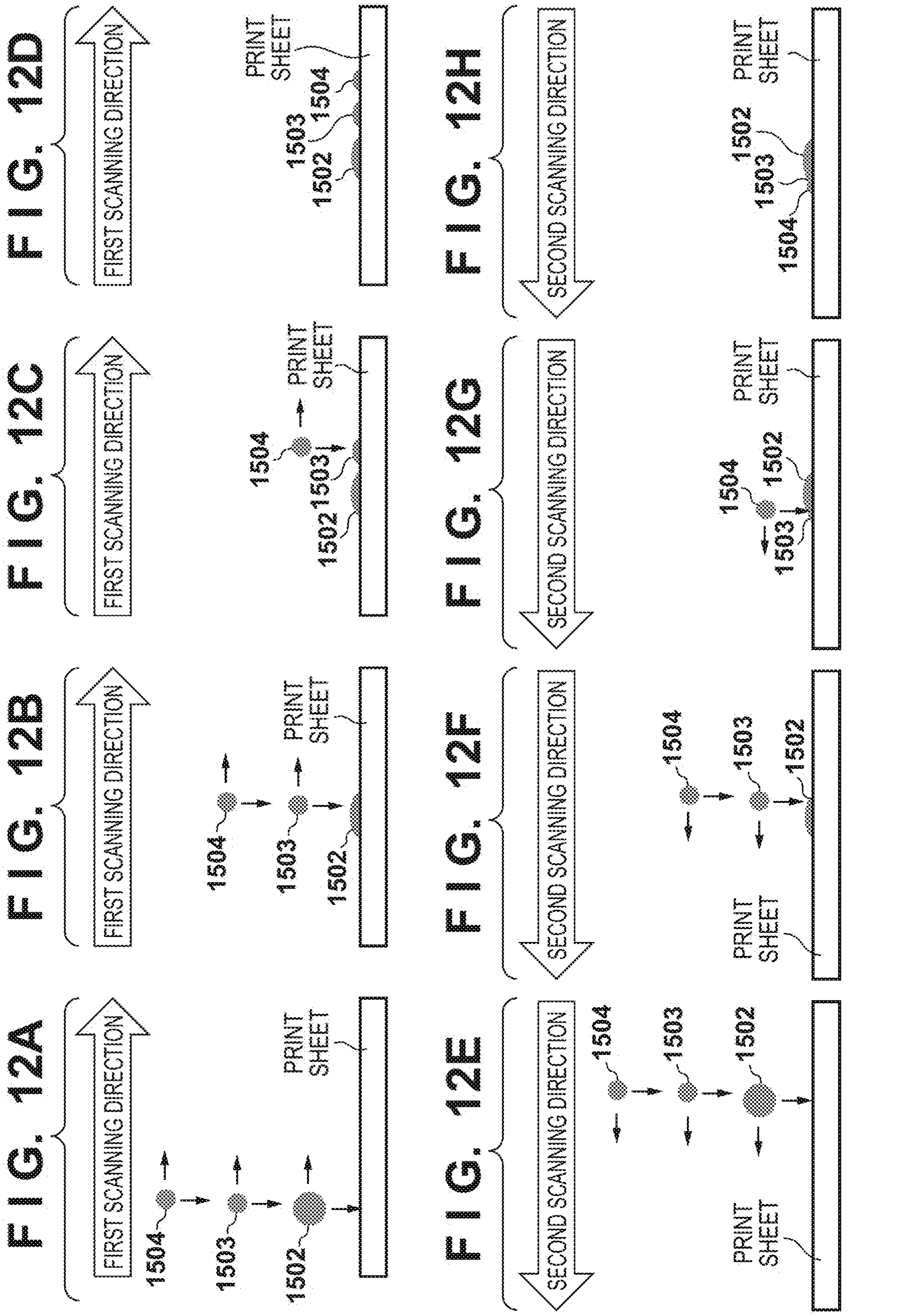
FIGS. 12A to 12H are views schematically showing a state in which a main droplet 1502 and satellites 1503 and 1504 land on a print medium in accordance with the scanning direction of a carriage.

In FIG. 12A, the center of the satellite 1503 exists on the front side of the center of the main droplet 1502 in the advancing direction, and the center of the satellite 1504 exists on the front side of the center of the satellite 1503 in the advancing direction. In FIG. 12B, the main droplet 1502 lands on the print medium, and the satellites 1503 and 1504 continue flying. In FIG. 12C, the satellite 1503 lands on a region not overlapping the ink application portion of the main droplet 1502, and the satellite 1504 continues flying. In FIG. 12D, the satellite 1504 lands on a region not overlapping the ink application portions of the main droplet 1502 and the satellite 1503. As a result, the satellites 1503 and 1504 land at positions separated from the landing position of the main droplet 1502.

In the case of the second scanning direction in which the carriage advances leftward in FIGS. 12E to 12H, the lapse of time until the main droplet and the satellites land is shown in time series in the order of FIGS. 12E, 12F, 12G, and 12H. In FIG. 12E, the center of the satellite 1503 exists on the rear side of the center of the main droplet 1502 in the advancing direction, and the center of the satellite 1504 exists on the rear side of the center of the satellite 1503 in the advancing direction. In FIG. 12F, the main droplet 1502 lands on the print medium, and the satellites 1503 and 1504 continue flying. In FIG. 12G, the satellite 1503 lands on a region overlapping the ink application portion of the main droplet 1502, and the satellite 1504 continues flying. In FIG. 12H, the satellite 1504 lands on a region overlapping the ink application portion of the main droplet 1502 or the satellite 1503. As a result, the satellites 1503 and 1504 land at positions close to the landing position of the main droplet 1502.

FIGS. 13A to 13H are views schematically showing a state in which when discharge from the nozzle of the second nozzle array group has the flight characteristic of the main droplet and the satellites shown in FIG. 11D, the main droplet 1506 and the satellites 1507 and 1508 land on the print medium in accordance with the scanning direction of the carriage. In FIGS. 13A to 13H, an arrow indicating the horizontal direction represents a force applied in the scanning direction of the carriage, and an arrow in the downward direction represents a force applied by ink discharge. In the case of the first scanning direction in which the carriage advances rightward in FIGS. 13A to 13D, the lapse of time until the main droplet and the satellites land is shown in time series in the order of FIGS. 13A, 13B, 13C, and 13D.

Figures 13A, 13B, 13C, 13D, 13E, 13F, 13G, 13H:
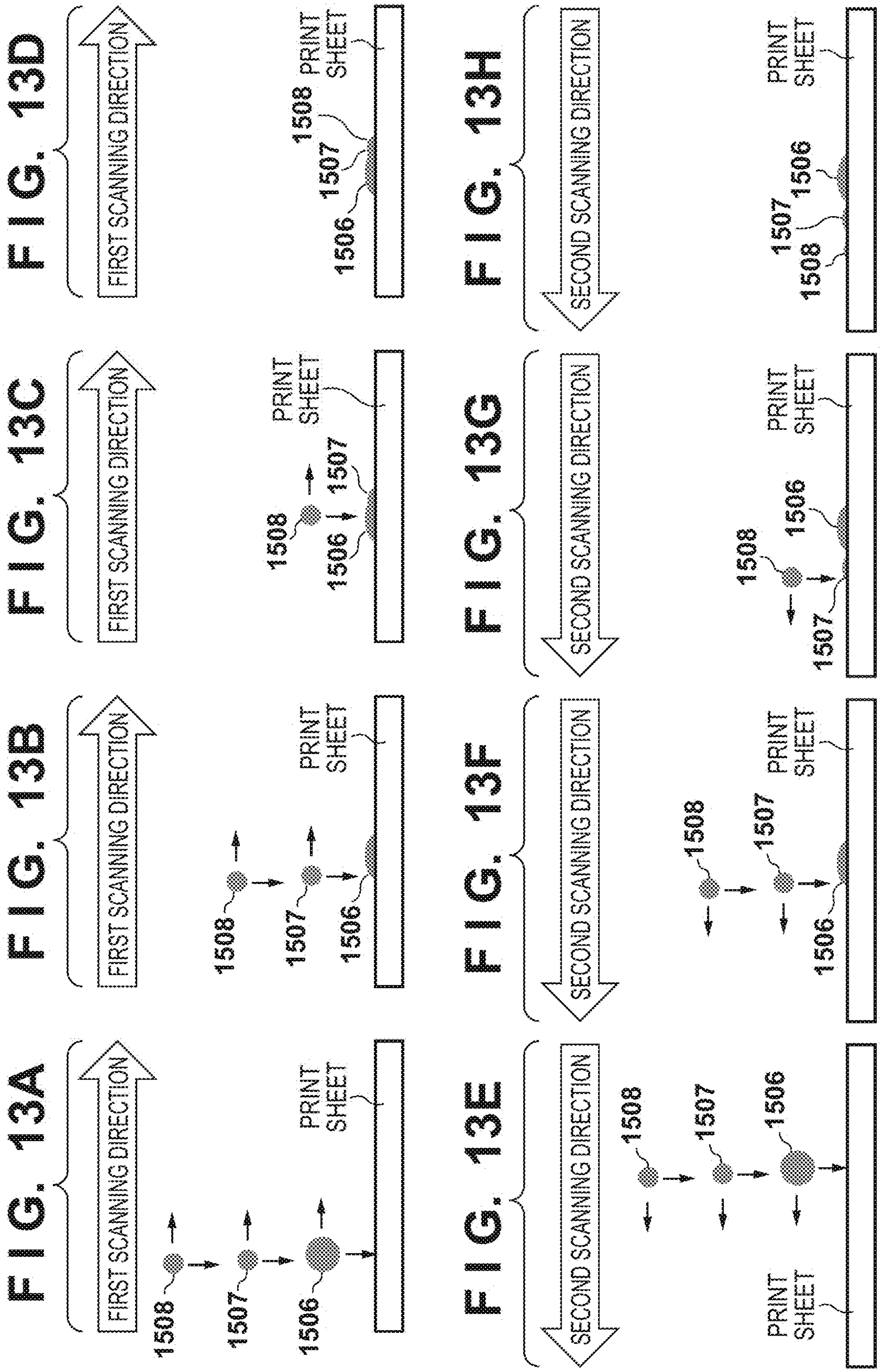
FIGS. 13A to 13H are views schematically showing a state in which a main droplet 1506 and satellites 1507 and 1508 land on a print medium in accordance with the scanning direction of a carriage.

In FIG. 13A, the center of the satellite 1507 exists on the rear side of the center of the main droplet 1506 in the advancing direction, and the center of the satellite 1508 exists on the rear side of the center of the satellite 1507 in the advancing direction. In FIG. 13B, the main droplet 1506 lands on the print medium, and the satellites 1507 and 1508 continue flying. In FIG. 13C, the satellite 1507 lands on a region overlapping the ink application portion of the main droplet 1506, and the satellite 1508 continues flying. In FIG. 13D, the satellite 1508 lands on a region overlapping the ink application portion of the main droplet 1506 or the satellite 1507. As a result, the satellites 1507 and 1508 land at positions close to the landing position of the main droplet 1506.

In the case of the second scanning direction in which the carriage advances leftward in FIGS. 13E to 13H, the lapse of time until the main droplet and the satellites land is shown in time series in the order of FIGS. 13E, 13F, 13G, and 13H. In FIG. 13E, the center of the satellite 1507 exists on the front side of the center of the main droplet 1506 in the advancing direction, and the center of the satellite 1508 exists on the front side of the center of the satellite 1507 in the advancing direction. In FIG. 13F, the main droplet 1506 lands on the print medium, and the satellites 1507 and 1508 continue flying. In FIG. 13G, the satellite 1507 lands on a region not overlapping the ink application portion of the main droplet 1506, and the satellite 1508 continues flying. In FIG. 13H, the satellite 1508 lands on a region not overlapping the ink application portions of the main droplet 1506 and the satellite 1507. As a result, the satellites 1507 and 1508 land at positions separated from the landing position of the main droplet 1506.

The flight characteristic of the main droplet and the satellites depending on the scanning direction of the carriage and the landing positions of the main droplet and the satellites on the print medium have been described above. As described above, if the flight characteristic of the main droplet and the satellites of an ink droplet discharged from each nozzle array group is different depending on the scanning direction of the carriage, the amount of satellites flying to the periphery of an edge region is different between an edge region adjacent to the boundary between an object and the margin region of the print medium in the first scanning direction and an edge region adjacent to the boundary between the object and the margin region of the print medium in the second scanning direction. An example of edge region image processing of thinning print pixels in consideration of the above flight characteristic will be described. In this embodiment, a description will be provided using the printhead in which the nozzle arrays are arrayed, as shown in FIGS. 9A to 9C.

FIGS. 14A to 14D are views for explaining processing performed for each of a first edge region and a second edge region detected by the above-described edge detection processing according to this embodiment. Assume here that the scanning direction of the carriage is the X direction in FIGS. 14A to 14D. The first edge region is a region formed from edge pixels on the object side adjacent to the boundary at which the object changes to the margin region when viewed in the +X direction. Similarly, the second edge region is a region formed from edge pixels on the object side adjacent to the boundary at which the object changes to the margin region when viewed in the −X direction.

Figure 14A:
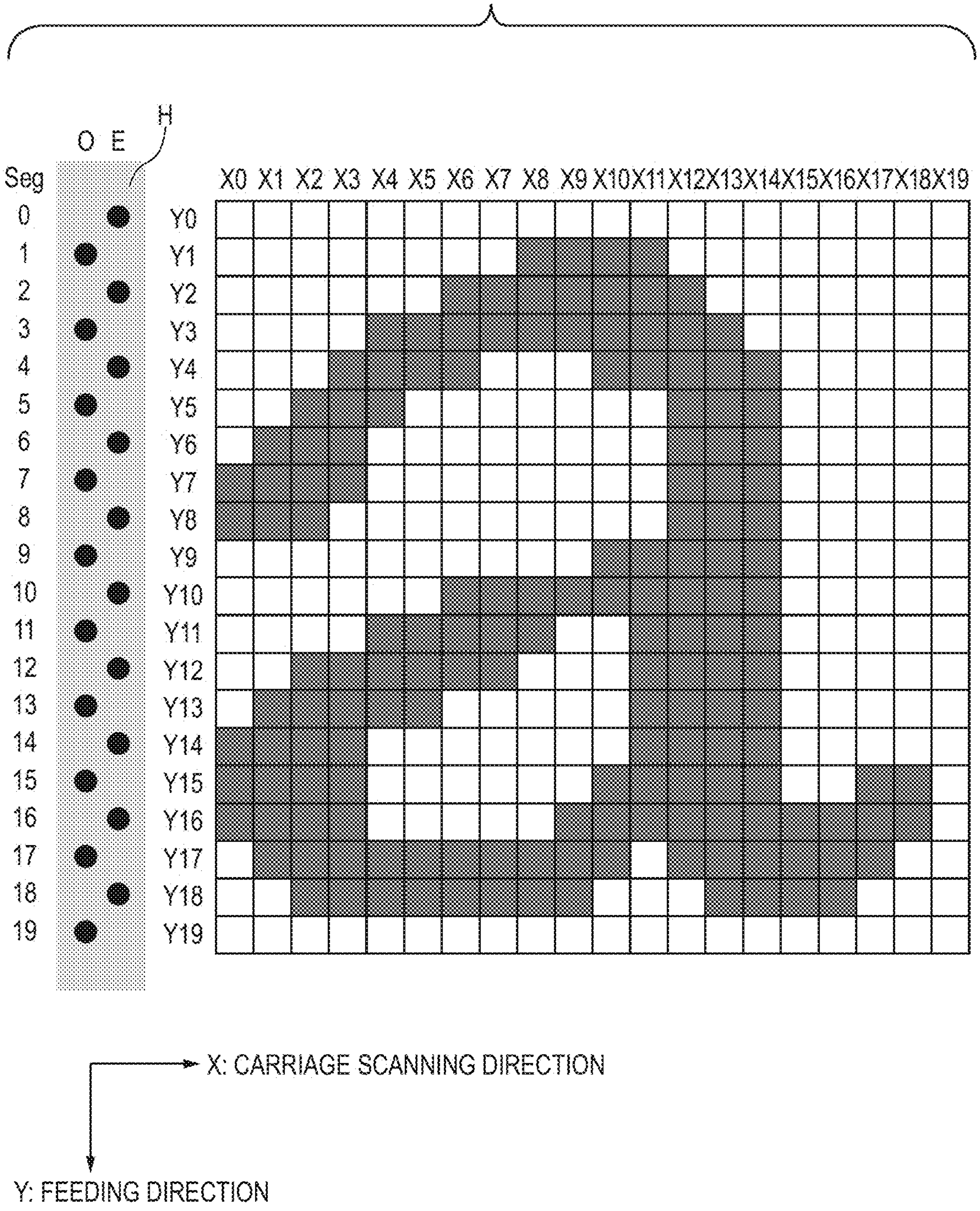
FIG. 14A is a view showing a printhead H and a quantization result of an input image.

FIG. 14A is a view showing the printhead H and "print data for a print resolution of 600 dpi in the X direction and 1,200 dpi in the Y direction" as the quantization result of the input image. In FIG. 14A, X0 to X19 represent pixel positions corresponding to the scanning direction of the carriage, and Y0 to Y19 represent pixel positions corresponding to the conveyance direction of the print medium. The downward direction in FIG. 14A is a feeding direction.

On the right side of the printhead H, the first nozzles with even Seg numbers are arrayed at an interval of 600 dpi, and are assigned to printing of pixels at pixel positions Ye (e is an even number) among the pixel positions Y0 to Y19. On the left side of the printhead H, the second nozzles with odd Seg numbers are arrayed at an interval of 600 dpi, and are assigned to printing of pixels at pixel positions Yo (o is an odd number) among the pixel positions Y0 to Y19.

Figure 14B:
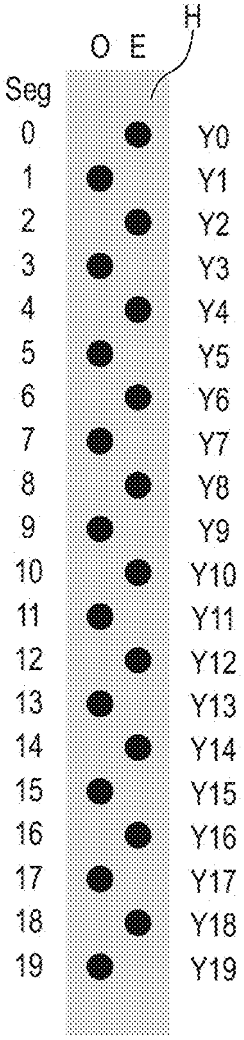
FIG. 14B is a view showing each pixel position assigned to a specific nozzle among nozzles arranged in the printhead H.

FIG. 14B is a view showing which of the nozzles arranged in the printhead H is assigned to each pixel position. The first nozzle is assigned to a pixel position added with "E" in FIG. 14B and the second nozzle is assigned to a pixel position added with "O" in FIG. 14B.

Figure 14C:
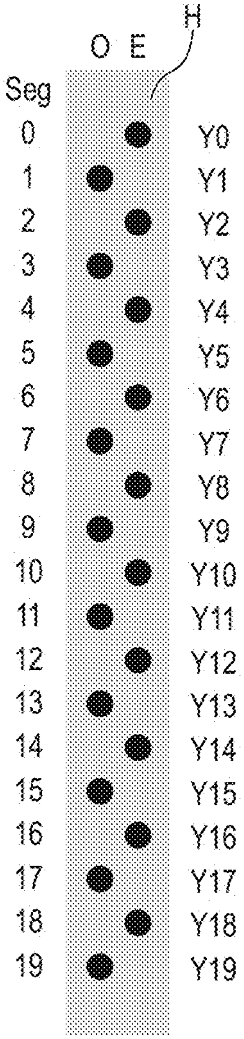
FIG. 14C is a view showing an edge processing result detected by edge detection processing.
Figure 14C:
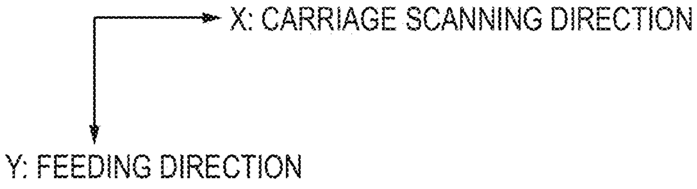

FIG. 14C is a view showing an edge processing result detected by the edge detection processing. With the above-described procedure of the edge processing, the first edge region and the second edge region are detected. In FIG. 14C, a pixel position added with "1" indicates the pixel position of a pixel determined as the first edge region in the edge detection processing, and a pixel position added with "2" indicates the pixel position of a pixel determined as the second edge region in the edge detection processing. Note that a pixel position added with "0" indicates the pixel position of a pixel determined as a non-edge region in the edge detection processing.

Figure 14D:
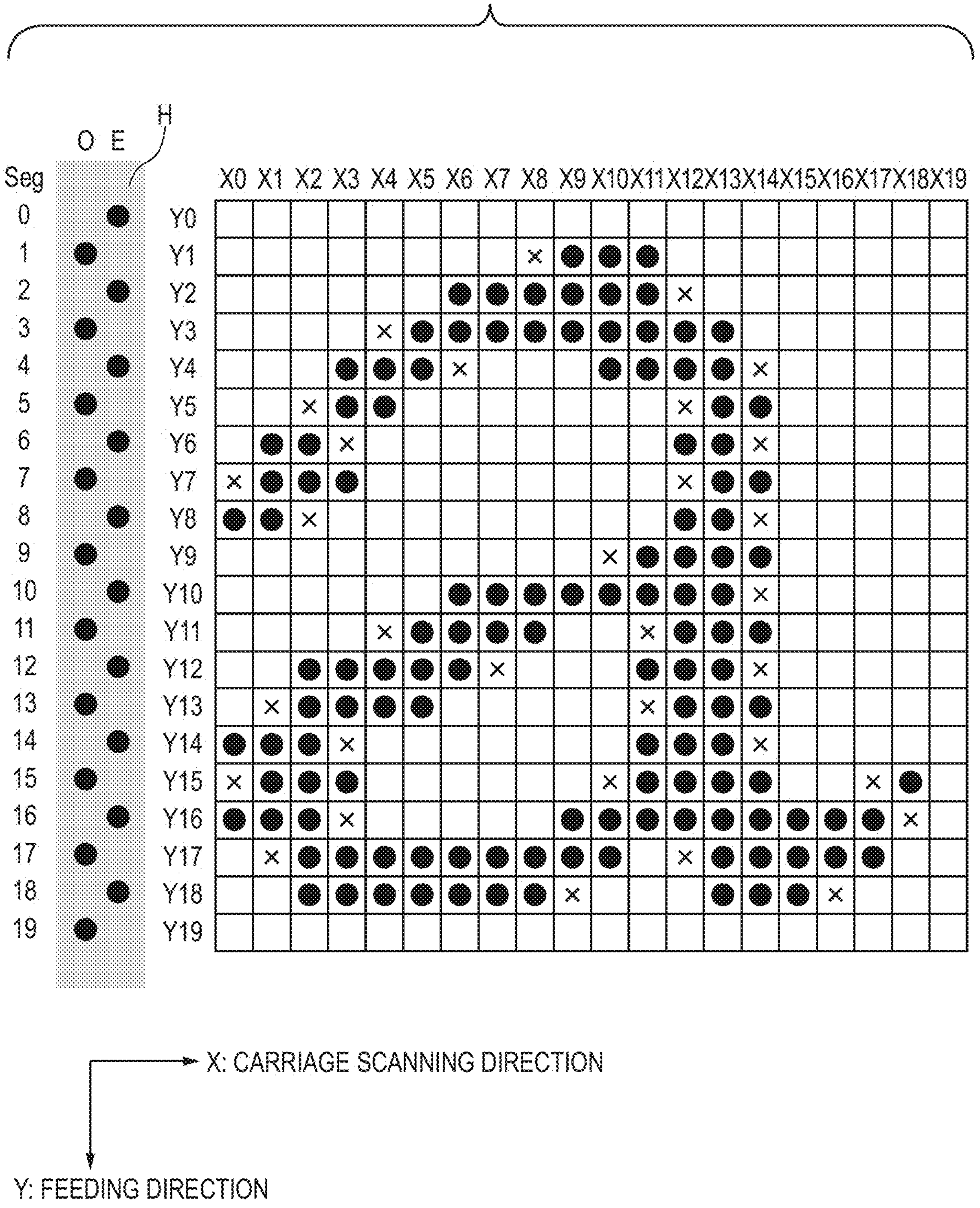
FIG. 14D is a view concerning thinning processing of print data arranged in a first edge region and a second edge region.

FIG. 14D is a view concerning thinning processing of the print data arranged in the first edge region and the second edge region. Among the pixels determined as the first edge region, pixels (pixels at pixel positions added with "E" in FIG. 14B) to be printed by ink droplets from the first nozzles are to be thinned. Among the pixels determined as the second edge region, pixels (pixels at pixel positions added with "O" in FIG. 14B) to be printed by ink droplets from the second nozzles are to be thinned. In FIG. 14D, pixels at pixel positions added with "x" are to be thinned, and do not undergo ink discharge. Among the pixel positions added with "0", "1", or "2" in FIG. 14C, the pixel positions of pixels (non-thinned pixels) other than the pixels to be thinned are added with "●". The non-thinned pixels are pixels to undergo ink discharge.

This thinning target settings are stored in advance in the ROM 206 or the like. Then, when generating print data, the printhead control unit 213 sets, based on the settings, as thinning targets, "pixels to be printed by ink droplets from the first nozzles among the pixels determined as the first edge region" and "pixels to be printed by ink droplets from the second nozzles among the pixels determined as the second edge region". That is, the printhead control unit 213 generates, from the input image, print data for deciding the presence/absence of discharge of an ink droplet from the printhead including the first nozzle array and the second nozzle array having a relative relationship different from a relative relationship between the main droplet and the satellites discharged from the first nozzle array. At this time, the printhead control unit 213 sets, as thinning targets, pixels to be printed by the nozzles of the first nozzle array among the pixels of the first edge region on the object side adjacent to the boundary at which the object changes to the margin region in the first scanning direction of the printhead. Similarly, the printhead control unit 213 sets, as thinning targets, pixels to be printed by the nozzles of the second nozzle array among the pixels of the second edge region on the object side adjacent to the boundary at which the object changes to the margin region in the second scanning direction reverse to the first scanning direction of the printhead. For the pixels set as the thinning targets, no ink is discharged.

Note that this embodiment aims at decreasing the use ratio of nozzles that cause many satellites to fly to the periphery of the edge in printing of the first edge region and printing of the second edge region. The present invention is not limited to the print data generation method of thinning all the pixels, as described in the above print data generation.

Figure 15A:
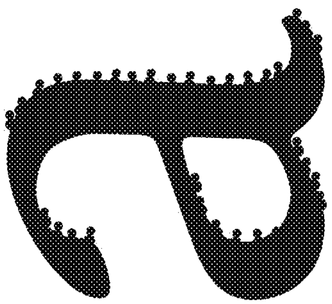
FIGS. 15A to 15D are views showing print results of printing a character "a" based on print data not having undergone edge processing and print results of printing a character "a" based on print data generated in the first embodiment.

FIG. 15A shows a print result when printing a character "a" in the first scanning direction based on print data not having undergone the edge processing according to this embodiment. The first edge region located on the front side when viewed in the first scanning direction is printed by the first nozzle array with which the distance between the main droplet and the satellite is relatively long and the second nozzle array with which the distance between the main droplet and the satellite is relatively short. Since the satellite flew from the first nozzle array flies in the advancing direction of the carriage, a blur is visually perceived in the first edge region, thereby causing deterioration in image quality (print quality) of the character and lines.

Figure 15B:
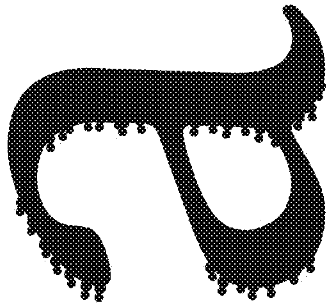

FIG. 15B shows a print result when printing a character "a" in the second scanning direction based on print data not having undergone the edge processing according to this embodiment. The second edge region located on the front side when viewed in the second scanning direction is printed by the first nozzle array with which the distance between the main droplet and the satellite is relatively short and the second nozzle array with which the distance between the main droplet and the satellite is relatively long. Since the satellite flew from the second nozzle array flies in the advancing direction of the carriage, a blur is visually perceived in the second edge region, thereby causing deterioration in image quality (print quality) of the character and lines.

Figure 15C:
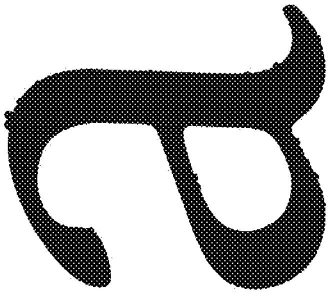

FIG. 15C shows a print result when printing a character "a" in the first scanning direction based on print data generated in this embodiment. The first edge region located on the front side when viewed in the first scanning direction is printed by the second nozzle array with which the distance between the main droplet and the satellite is relatively short without using the first nozzle array with which the distance between the main droplet and the satellite is relatively long. Furthermore, the second edge region located on the rear side in the first scanning direction is printed by the first nozzle array without using the second nozzle array. Since the satellite flies in the advancing direction of the carriage, the satellite overlaps a non-edge region and is thus not recognized as a failure.

Figure 15D:
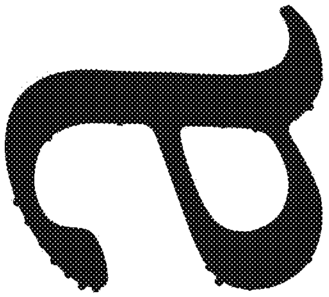

FIG. 15D shows a print result when printing a character "a" in the second scanning direction based on print data generated in this embodiment. The second edge region located on the front side when viewed in the second scanning direction is printed by the first nozzle array with which the distance between the main droplet and the satellite is relatively short without using the second nozzle array with which the distance between the main droplet and the satellite is relatively long. Furthermore, the first edge region located on the rear side in the second scanning direction is printed by the second nozzle array without using the first nozzle array. Since the satellite flies in the advancing direction of the carriage, the satellite overlaps a non-edge region and is thus not recognized as a failure.

Figure 16:
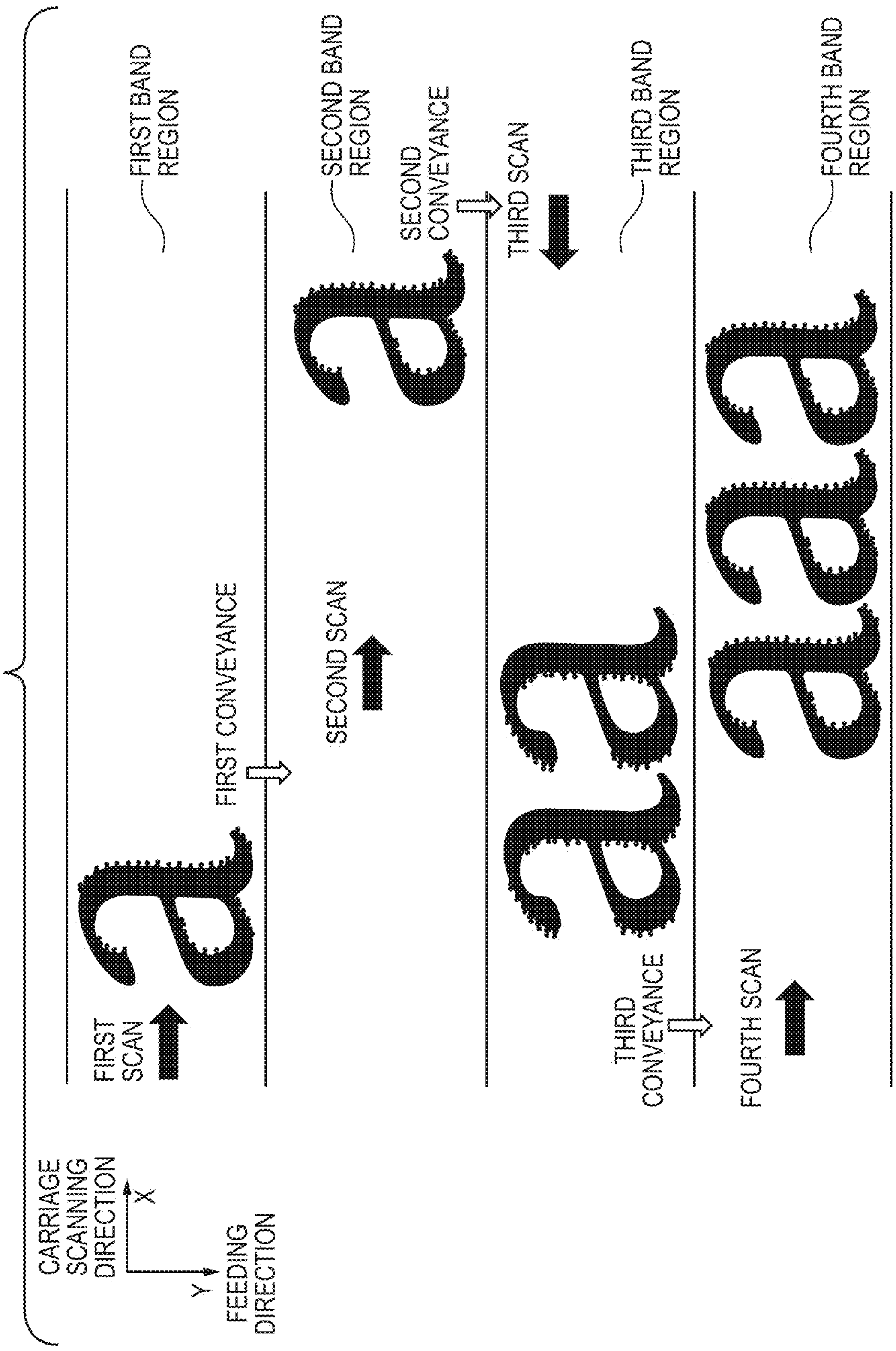
FIG. 16 is a view showing an example of a result of repeating print scanning and conveyance of a print medium a plurality of times by the carriage based on print data not having undergone edge processing and executing printing on the print medium.

FIG. 16 shows an example of a result of repeating print scanning and conveyance of the print medium a plurality of times by the carriage based on print data not having undergone the edge processing and executing printing on the print medium according to this embodiment.

First, the carriage is scanned in the first scanning direction to execute printing based on print data of a first band region. After executing printing based on all the print data of the first band region, the print medium is conveyed by conveyance (first conveyance) of the print medium to be able to execute printing on a second band region.

Subsequently, the carriage is scanned in the first scanning direction to execute printing based on print data of the second band region. After executing printing based on all the print data of the second band region, the print medium is conveyed by conveyance (second conveyance) of the print medium to be able to execute printing on a third band region.

Subsequently, the carriage is scanned in the second scanning direction to execute printing based on print data of the third band region. After executing printing based on all the print data of the third band region, the print medium is conveyed by conveyance (third conveyance) of the print medium to be able to execute printing on a fourth band region.

Finally, the carriage is scanned in the first scanning direction to execute printing based on all print data of the fourth band region.

As described above, in the print result of executing printing in the first scanning direction and the second scanning direction using the print data not having undergone the edge processing according to this embodiment, the flight of the satellites is conspicuous on the periphery of the edge, thereby causing deterioration in print quality of the lines and characters. In addition, when a plurality of print data are selected in accordance with the scanning direction (not shown), the image uniformity with the adjacent print region degrades, thereby decreasing the throughput.

Figure 17:
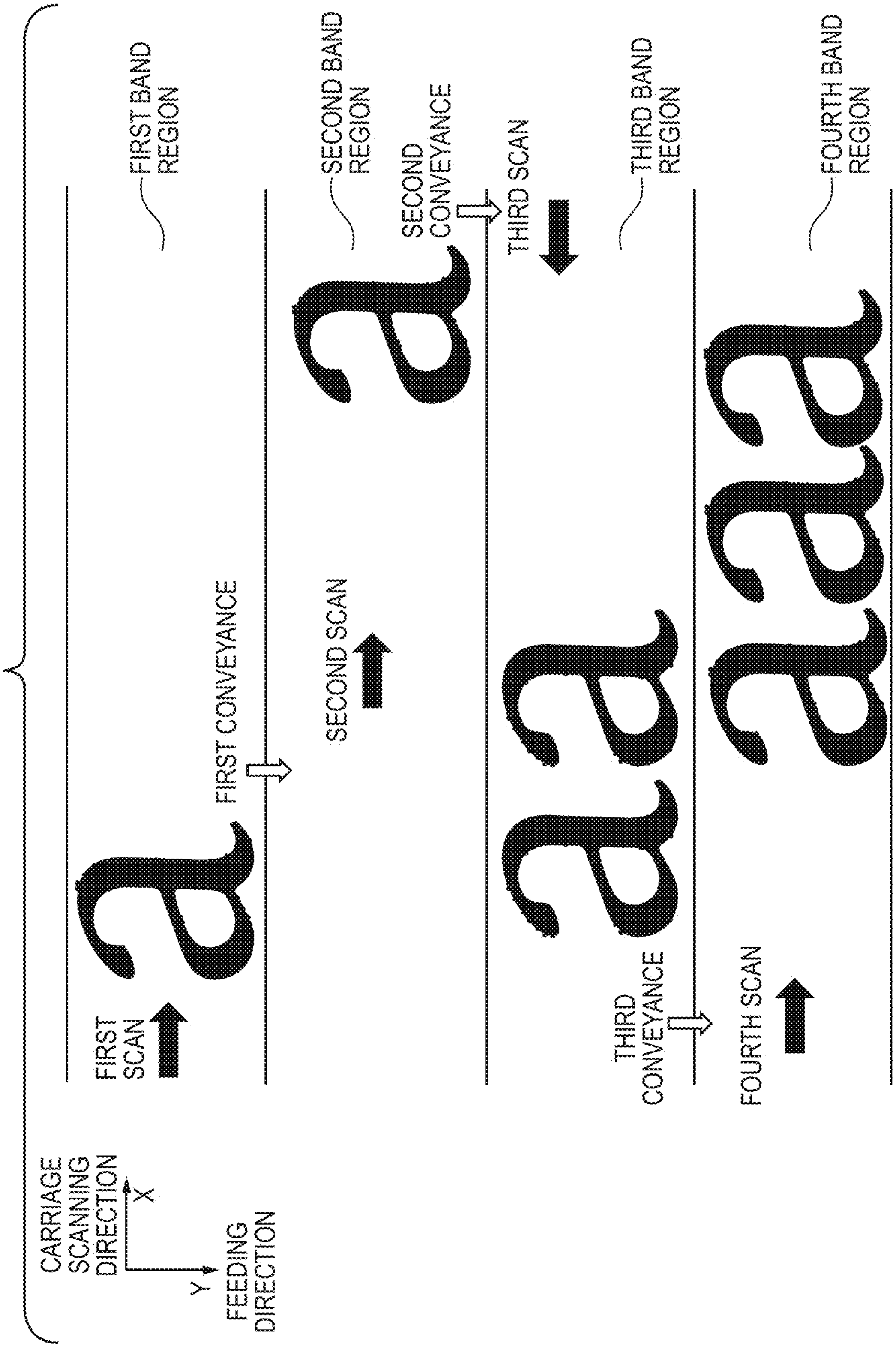
FIG. 17 is a view showing an example of a result of repeating print scanning and conveyance of a print medium a plurality of times by the carriage based on print data having undergone edge processing and executing printing on the print medium.

FIG. 17 shows an example of a result of repeating print scanning and conveyance of the print medium a plurality of times by the carriage based on print data having undergone the edge processing and executing printing on the print medium according to this embodiment.

First, the carriage is scanned in the first scanning direction to execute printing based on the print data of the first band region. After executing printing based on all the print data of the first band region, the print medium is conveyed by conveyance (first conveyance) of the print medium to be able to execute printing on the second band region.

Subsequently, the carriage is scanned in the first scanning direction to execute printing based on the print data of the second band region. After executing printing based on all the print data of the second band region, the print medium is conveyed by conveyance (second conveyance) of the print medium to be able to execute printing on the third band region.

Subsequently, the carriage is scanned in the second scanning direction to execute printing based on the print data of the third band region. After executing printing based on all the print data of the third band region, the print medium is conveyed by conveyance (third conveyance) of the print medium to be able to execute printing on the fourth band region.

Finally, the carriage is scanned in the first scanning direction to execute printing based on all the print data of the fourth band region.

As described above, as the print result of executing printing in the first scanning direction and the second scanning direction using the print data generated by the edge processing according to this embodiment, it is possible to print high-quality lines and characters in which the flight of the satellites is not conspicuous on the periphery of the edge. In addition, since it is unnecessary to select a plurality of print data in accordance with the scanning direction with respect to the print data generated in this embodiment, it is possible to shorten the time taken to generate the print data.

As a result, in the configuration of the printhead having the flight characteristic that the relative landing distance of the satellite accompanying the main droplet of discharged ink is different depending on the scanning direction, it is possible to suppress degradation in image uniformity with the adjacent print region and a decrease in throughput while printing high-quality lines and characters.

Second Embodiment

Figure 18B:
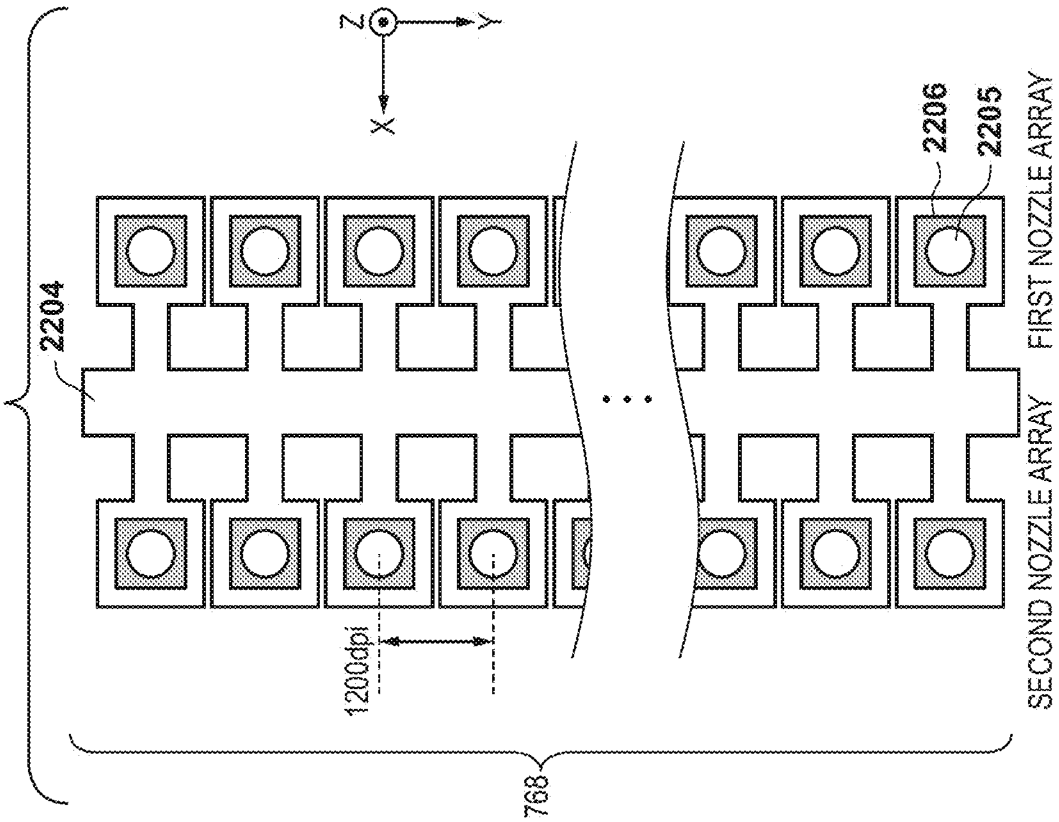
FIGS. 18A and 18B are views showing the configuration of a printhead.
Figure 18A:
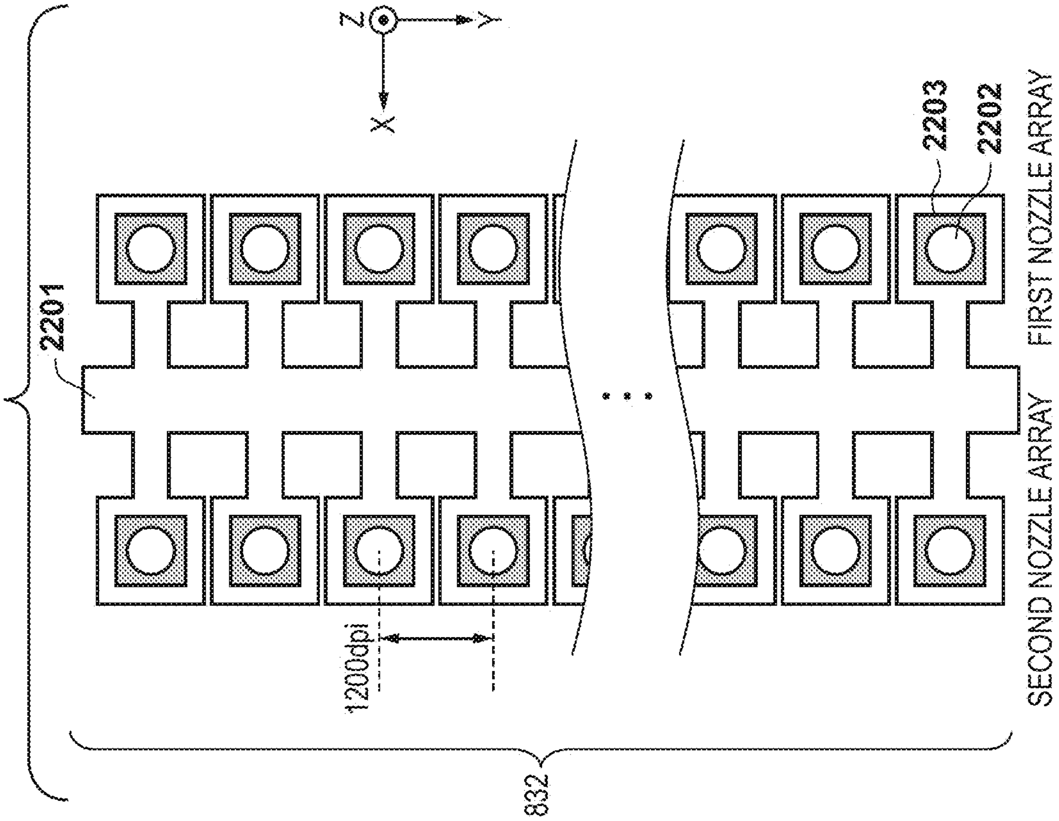

The difference from the first embodiment will be described below, and the second embodiment is assumed to be the same as the first embodiment, unless it is specifically stated otherwise. FIGS. 18A and 18B show the configuration of a printhead used in this embodiment.

FIG. 18A shows a black nozzle array in which a first nozzle array and a second nozzle array are arranged at positions symmetrical to each other in the X direction with respect to an ink channel 2201 as the center. A discharge heater 2203 is arranged immediately below each nozzle (on the +Z direction side). When the heater 2203 is applied with a voltage, it generates heat to generate a bubble, thereby causing the corresponding nozzle to discharge ink. In each of the first nozzle array and the second nozzle array, 832 nozzles 2202 are arranged in the Y direction at a pitch of 1,200 dpi. The first nozzle array and the second nozzle array are arrayed at positions parallel to each other in the X direction. By performing print scanning using the black nozzle array having the above arrangement, a print medium can be printed at a print resolution of 1,200 dpi in the Y direction.

As for the print density in the X direction, each of the first nozzle array and the second nozzle array discharges ink at a resolution of 600 dpi in the scanning direction of a carriage, and one or both of the first nozzle array and the second nozzle array are used to eject a droplet. This can realize a print resolution of 600 dpi on the print medium.

FIG. 18B shows one nozzle array among color nozzle arrays, in which a first nozzle array and a second nozzle array are arranged at positions symmetrical to each other in the X direction with respect to an ink channel 2204 as the center. A discharge heater 2206 is arranged immediately below each nozzle (on the +Z direction side). When the heater 2206 is applied with a voltage, it generates heat to generate a bubble, thereby causing the corresponding nozzle to discharge ink. In each of the first nozzle array and the second nozzle array, 832 nozzles 2205 are arranged in the Y direction at a pitch of 1,200 dpi. The first nozzle array and the second nozzle array are arrayed at positions parallel to each other in the X direction. By performing print scanning using the color nozzle array having the above arrangement, the print medium can be printed at a print resolution of 1,200 dpi in the Y direction.

The contents of the structure of the printhead used in the second embodiment have been described above.

<Print Data Generation of Present Embodiment>

Figure 19A:
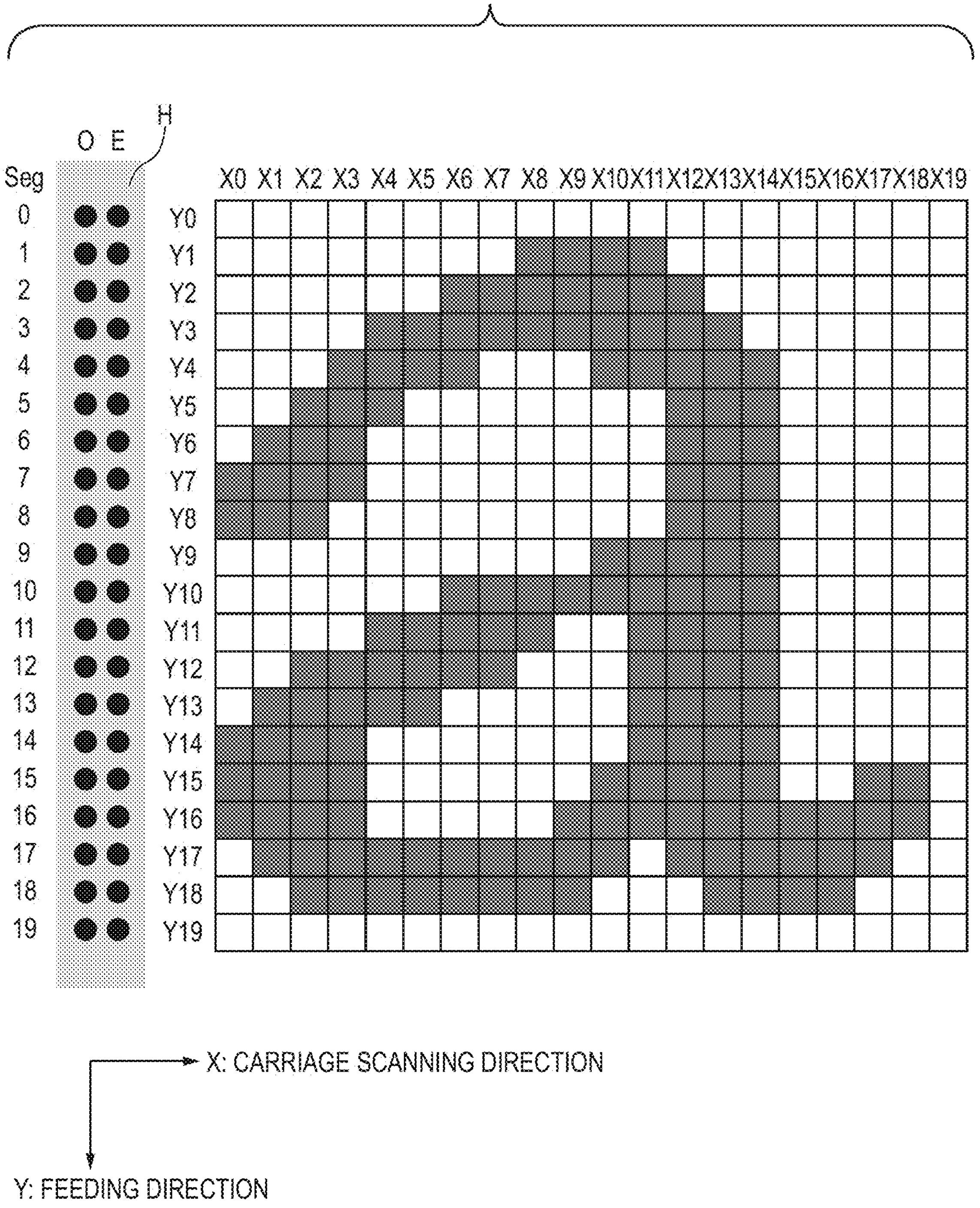
FIG. 19A is a view showing a printhead H and a quantization result of an input image.

FIGS. 19A to 19D are views for explaining image processing to be performed for a first edge region and a second edge region detected by the above-described edge detection processing according to this embodiment. FIG. 19A is a view showing a printhead H and "print data for a print resolution of 600 dpi in the X direction and 1,200 dpi in the Y direction" as the quantization result of an input image. In FIG. 19A, X0 to X19 represent pixel positions corresponding to the scanning direction of the carriage, and Y0 to Y19 represent pixel positions corresponding to the conveyance direction of the print medium. The downward direction in FIG. 19A is a feeding direction.

With respect to the Y direction, "first nozzles with Seg numbers of 0 to 19 arrayed at an interval of 1,200 dpi" and "second nozzles with Seg numbers of 0 to 19 arrayed at an interval of 1,200 dpi" that are arranged in the printhead H are assigned to printing of pixels at the pixel positions Y0 to Y19.

On the other hand, with respect to the X direction, the first nozzles with odd Seg numbers in the first nozzle array and the second nozzles with even Seg numbers in the second nozzle array are assigned to printing of pixels at pixel positions Ye (e is an even number) among the pixel positions X0 to X19. In addition, the first nozzles with even Seg numbers in the first nozzle array and the second nozzles with odd Seg numbers in the second nozzle array are assigned to printing of pixels at pixel positions Yo (o is an odd number) among the pixel positions X0 to X19. As a result, it is possible to execute printing on the print medium at a print resolution of 600 dpi in the scanning direction of the carriage.

Figure 19B:
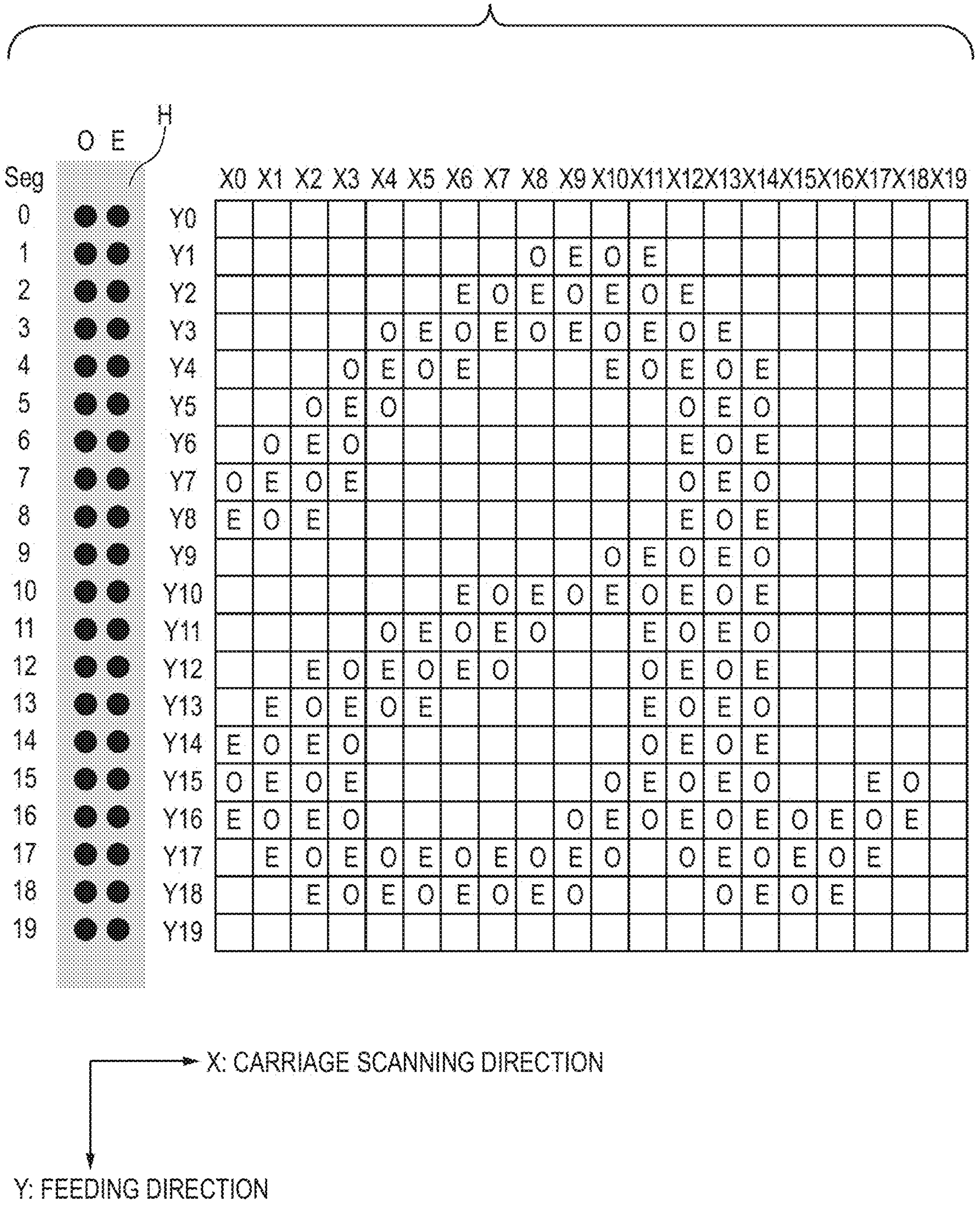
FIG. 19B is a view showing each pixel position assigned to a specific nozzle among nozzles arranged in the printhead H.

FIG. 19B is a view showing which of the nozzles arranged in the printhead H is assigned to each pixel position. The first nozzle is assigned to a pixel position added with "E" in FIG. 19B and the second nozzle is assigned to a pixel position added with "O" in FIG. 19B.

Figure 19C:
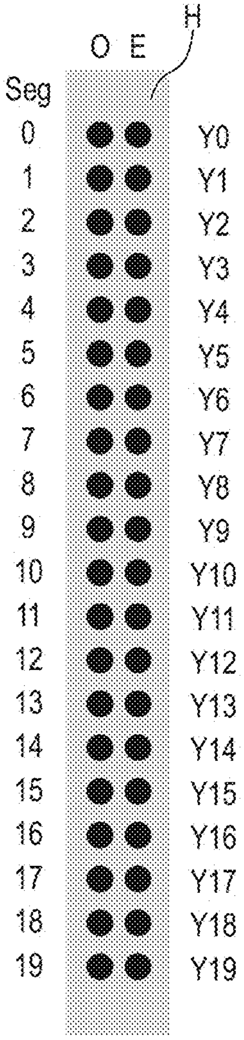
FIG. 19C is a view showing an edge processing result detected by edge detection processing.
Figure 19C:
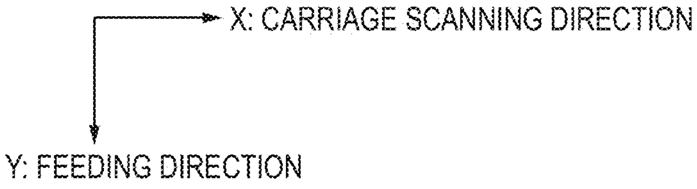

FIG. 19C is a view showing an edge processing result detected by the edge detection processing. With the above-described procedure of the edge processing, the first edge region and the second edge region are detected. In FIG. 19C, a pixel position added with "1" indicates the pixel position of a pixel determined as the first edge region in the edge detection processing, and a pixel position added with "2" indicates the pixel position of a pixel determined as the second edge region in the edge detection processing. Note that a pixel position added with "0" indicates the pixel position of a pixel determined as a non-edge region in the edge detection processing.

Figure 19D:
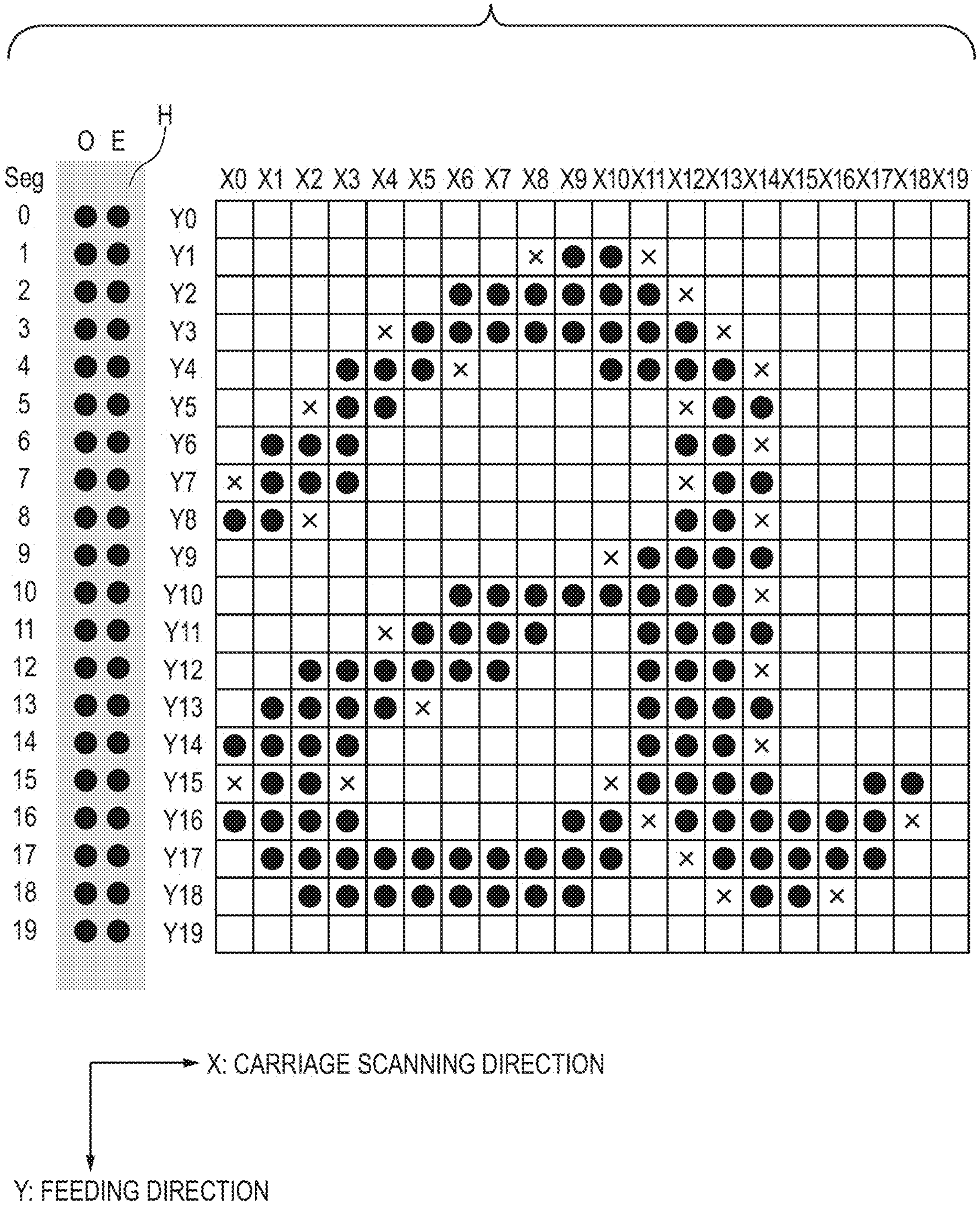
FIG. 19D is a view concerning thinning processing of print data arranged in a first edge region and a second edge region.

FIG. 19D is a view concerning thinning processing of print data arranged in the first edge region and the second edge region. Among the pixels determined as the first edge region, pixels (pixels at pixel positions added with "E" in FIG. 19B) to be printed by ink droplets from the first nozzles are to be thinned. Among the pixels determined as the second edge region, pixels (pixels at pixel positions added with "O" in FIG. 19B) to be printed by ink droplets from the second nozzles are to be thinned. In FIG. 19D, pixels at pixel positions added with "x" are to be thinned, and do not undergo ink discharge. Among the pixel positions added with "0", "1", or "2" in FIG. 19C, the pixel positions of pixels (non-thinned pixels) other than the pixels to be thinned are added with "●". The non-thinned pixels are pixels to undergo ink discharge.

In this embodiment as well, a printhead control unit 213 generates print data in the same manner as in the first embodiment. The contents of the first print data generation used in the second embodiment have been described above.

Note that this embodiment aims at decreasing the use ratio of nozzles that cause many satellites to fly to the periphery of the edge in printing of the first edge region and printing of the second edge region. The present invention is not limited to the print data generation method of thinning the pixels, as described in the first print data generation.

Figure 22:
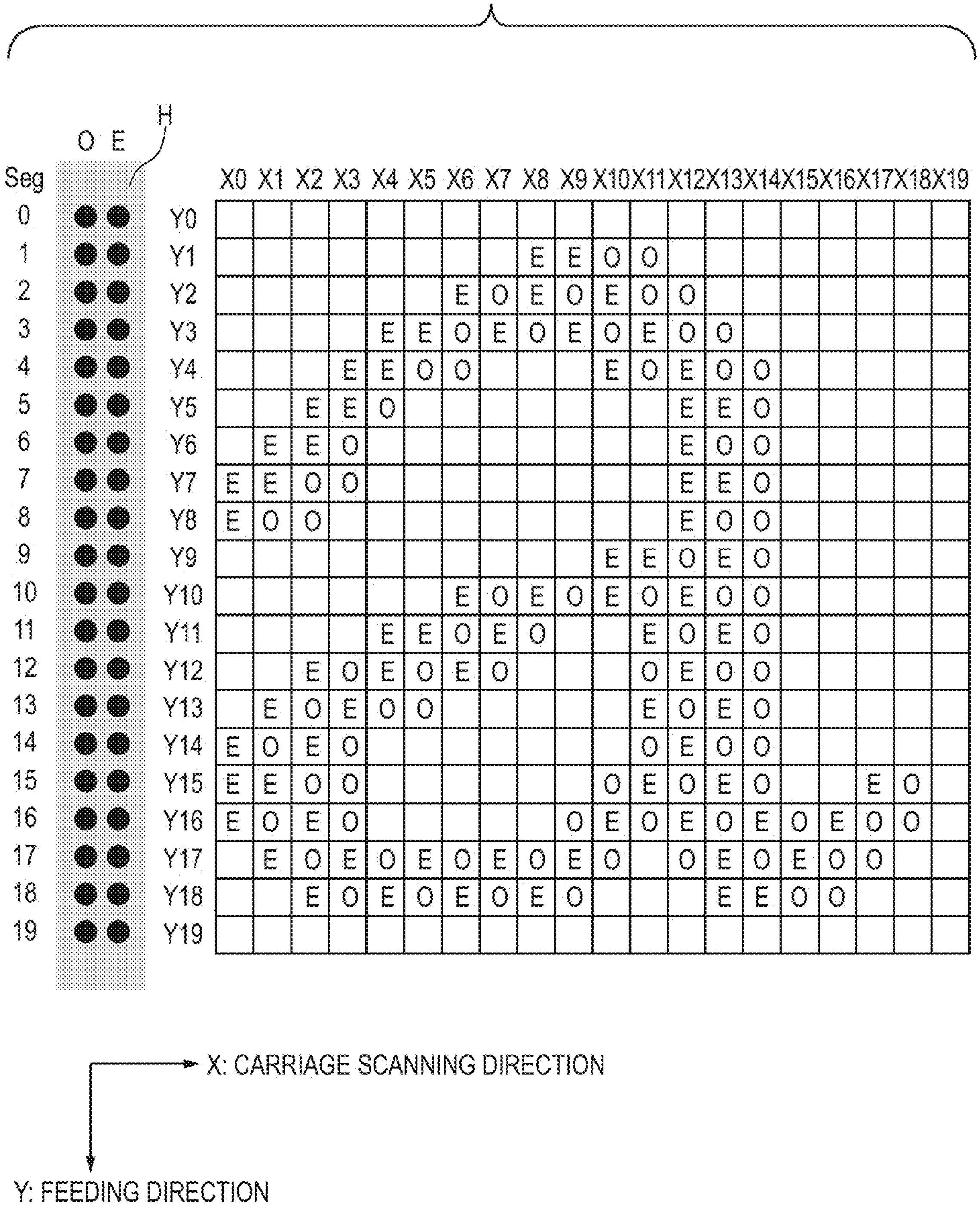
FIG. 22 is a view showing decision of a nozzle to be used for printing of each pixel.

Second print data generation according to this embodiment will now be described. A pixel that is added with "E" in FIG. 19B and added with "1" in FIG. 19C is a pixel printed by the second nozzle. The second nozzle prints at a pixel position added with "O" in FIG. 19B. On the other hand, a pixel that is added with "O" in FIG. 19B and added with "2" in FIG. 19C is a pixel printed by the first nozzle. The first nozzle prints at a pixel position added with "E" in FIG. 19B. As a result, a nozzle to be used for printing of each pixel is decided, as shown in FIG. 22.

As described above, by generating second print data, nozzles for printing the first edge region and the second edge region are assigned. As a result, it is possible to decrease the use ratio of nozzles that cause relatively many satellites to fly in printing on the periphery of the edge.

A print result when generation of the first print data and the second print data used in this embodiment is used is the same as the contents described with reference to FIGS. 15C and 15D in the first embodiment and a description thereof will be omitted. The scanning direction of the carriage and a print result formed on the print medium according to this embodiment are the same as the contents described with reference to FIG. 17 in the first embodiment and a description thereof will be omitted.

As described above, in the print result printed in the first scanning direction and the second scanning direction using the print data generated by the edge processing of this embodiment, it is possible to print high-quality lines and characters with less satellites flying to the periphery of the edge. In addition, since it is unnecessary to select a plurality of print data in accordance with the scanning direction with respect to the print data generated in this embodiment, it is possible to shorten the time taken to generate the print data.

As a result, in the configuration of the printhead having the flight characteristic that the relative landing distance of the satellite accompanying the main droplet of discharged ink is different depending on the scanning direction, it is possible to suppress degradation in image uniformity with the adjacent print region and a decrease in throughput while printing high-quality lines and characters.

(Exception Processing)

Each of the first embodiment and the second embodiment has explained an example of suppressing flight of satellites to the periphery of an edge by thinning pixels assigned with nozzles that cause many satellites to fly in accordance with the scanning direction of the carriage with respect to the first edge region and the second edge region detected by edge detection. In a case of print data generation by thinning, if, for example, an edge region is thinned by a ruled line with a width as small as 1 dot at 600 dpi, the density of a line decreases, thereby degrading visibility of the line.

To cope with this, exception processing of setting pixels not to be thinned by not detecting the pixels as the first edge region or the second edge region in a case of a predetermined line width or less may be performed. That is, pixels that continue in the scanning direction of the carriage and the number of which is equal to a predetermined number are to be thinned, and pixels that continue in the scanning direction of the carriage and the number of which is smaller than the predetermined number are not to be thinned. Furthermore, pixels that continue in the conveyance direction of the print medium and the number of which is equal to the predetermined number are to be thinned, and pixels that continue in the conveyance direction of the print medium and the number of which is smaller than the predetermined number are not to be thinned.

As described above, this embodiment has explained the edge processing for a specific color having the flight characteristic that the relative landing distance of the satellite accompanying the main droplet of discharged ink is different depending on the scanning direction. However, if the flight characteristic changes for each color, the edge detection condition and edge processing contents may be changed in accordance with the flight characteristic.

Furthermore, since the flight characteristic of an ink droplet depends on discharge conditions such as an ink refill speed and a discharge frequency and print conditions such as a carriage scanning speed and a distance between sheets, the edge detection condition and edge processing contents may be changed in accordance with a selected print command.

This embodiment has provided a description using a one-pass mode of printing an image by one scan of the printhead in a unit region on the print medium but the same effect is obtained by using a multi-pass mode of printing an image by a plurality of scans in a unit region.

As described above, the characteristic of a satellite is different depending on whether a scan is executed in the first scanning direction or the second scanning direction. In a scan in the first scanning direction, when printing the first edge region by the first nozzle array, satellites tend to be conspicuous in a print image. Similarly, in a scan in the second scanning direction, when printing the second edge region by the second nozzle array, satellites tend to be conspicuous in a print image. In this embodiment, pixels at which satellites tend to be conspicuous in a print image are to be thinned. However, in either the one-pass mode or the multi-pass mode, unless the scanning direction in which each of the pixels of the first edge region and the second edge region is printed is decided, it is unknown whether the pixel is a pixel at which a satellite tends to be conspicuous. Therefore, pixels printed by the nozzles of the first nozzle array among the pixels of the first edge region and pixels printed by the nozzles of the second nozzle array among the pixels of the second edge region are preset to be thinned regardless of the scanning direction in which each pixel is printed. This can prevent deterioration in image quality caused by satellites in a printed image even if a scan for actual printing is executed in either the first scanning direction or the second scanning direction.

Thus, the present invention can cope with a case where an irregular operation such as an operation of turning back and scanning the printhead is performed, for example, a case where a margin region where no image is printed continues or a case where an image is arranged only in a partial region on the print medium. If binary data is generated in accordance with the direction every time, the throughput of printing decreases. Therefore, by generating, in advance, print data not to generate satellites, it is possible to suppress deterioration in image quality for any operation of the printhead.

As described above, not all of pixels printed by the nozzles of the first nozzle array among the pixels of the first edge region and pixels printed by the nozzles of the second nozzle array among the pixels of the second edge region need to be set to be thinned. The ratio of the pixels printed by the nozzles of the first nozzle array to the pixels of the first edge region is made lower than the ratio of the pixels printed by the nozzles of the second nozzle array. In addition, the ratio of the pixels printed by the nozzles of the second nozzle array to the pixels of the second edge region is made lower than the ratio of the pixels printed by the nozzles of the first nozzle array.

Furthermore, this embodiment has provided a description using the printing method in which the printhead performs print scanning in one of the first scanning direction and the second scanning direction. However, the same effect is obtained even in a single scanning direction mode of printing only in the first scanning direction or the second scanning direction.

Furthermore, in each of the first embodiment and the second embodiment, only the edge region is set to be thinned. However, N pixels may be set to be thinned toward the inside of an object (the character "a" in the above example) including an edge region in accordance with the moving speed of the carriage. In this case, N may be preset to be larger as the moving speed of the carriage is higher.

In addition, each function unit of the image processing unit 208 may be implemented by hardware or some or all of the function units may be implemented by software (computer programs). In the latter case, the computer program is stored in the ROM 206 and the function of the corresponding function unit is implemented when the CPU 203 executes the computer program.

Numerical values, processing timings, processing orders, main constituents of processing, acquisition methods/transmission destinations/transmission sources/storage locations of data (information) used in the above-described embodiments are merely examples for a detailed explanation. The present invention is not intended to limit these to the examples.

Some or all of the above-described embodiments may be used in combinations as needed. Alternatively, some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-131461, filed Aug. 10, 2023, and Japanese Patent Application No. 2024-101423, filed Jun. 24, 2024, which are hereby incorporated by reference herein in their entirety.

What is claimed is:

1. An image processing apparatus comprising:

an acquisition unit configured to acquire an input image including a target object; and a generation unit configured to generate, based on the input image, print data representing the presence/absence of application of an ink droplet from a print unit, wherein the print unit includes a first print element array and a second print element array in each of which print elements each for applying an ink droplet are arrayed, and reciprocally scans in a first direction and a second direction reverse to the first direction, and the generation unit generates the print data so that:

a first edge region of the target object where a ratio of pixels printed by at least one print element included in the first print element array to a plurality of pixels included in the first edge region is lower than a ratio of pixels printed by at least one print element included in the second print element array is a region contacting a boundary at which the object changes to a margin region of a print medium when viewed in the first direction, and a second edge region of the target object where a ratio of pixels printed by at least one print element included in the second print element array to a plurality of pixels included in the second edge region is lower than a ratio of pixels printed by at least one print element included in the first print element array is a region contacting a boundary at which the object changes to the margin region of the print medium when viewed in the second direction.

2. The apparatus according to claim 1, wherein the generation unit decreases the pixels printed by at least one print element included in the first print element array in the first edge region, and decreases the pixels printed by at least one print element included in the second print element array in the second edge region.

3. The apparatus according to claim 1, wherein in the generated print data, in the first edge region, the number of pixels printed by at least one print element included in the first print element array is 0, and in the second edge region, the number of pixels printed by at least one print element included in the second print element array is 0.

4. The apparatus according to claim 1, further comprising a detection unit configured to detect the first edge region and the second edge region of the target object from the input image.

5. The apparatus according to claim 4, wherein the detection unit does not detect the first edge region and the second edge region from an object in which the number of pixels that continue in the first direction is less than a predetermined number.

6. The apparatus according to claim 4, wherein the detection unit does not detect the first edge region and the second edge region from an object in which the number of pixels that continue in a conveyance direction of a print medium intersecting the first direction is less than a predetermined number.

7. The apparatus according to claim 1, wherein in the print unit, the first print element array and the second print element array are supplied with ink from the same liquid chamber.

8. The apparatus according to claim 7, wherein in the print unit, the first print element array is located on a front side of the second print element array in the first direction via the liquid chamber.

9. The apparatus according to claim 1, wherein the first print element array is located on a front side of the second print element array in the first direction.

10. The apparatus according to claim 1, wherein the first print element array and the second print element array are supplied with ink from a common channel.

11. An image processing method comprising:

acquiring an input image including a target object; and generating, based on the input image, print data representing the presence/absence of application of an ink droplet from a print unit, wherein the print unit includes a first print element array and a second print element array in each of which print elements each for applying an ink droplet are arrayed, and reciprocally scans in a first direction and a second direction reverse to the first direction, and the print data is generated so that:

a first edge region of the target object where a ratio of pixels printed by at least one print element included in the first print element array to a plurality of pixels included in the first edge region is lower than a ratio of pixels printed by at least one print element included in the second print element array is a region contacting a boundary at which the object changes to a margin region of a print medium when viewed in the first direction, and a second edge region of the target object where a ratio of pixels printed by at least one print element included in the second print element array to a plurality of pixels included in the second edge region is lower than a ratio of pixels printed by at least one print element included in the first print element array is a region contacting a boundary at which the object changes to the margin region of the print medium when viewed in the second direction.

12. A non-transitory computer-readable storage medium storing a computer program for causing a computer to function as:

an acquisition unit configured to acquire an input image including a target object; and a generation unit configured to generate, based on the input image, print data representing the presence/absence of application of an ink droplet from a print unit, wherein the print unit includes a first print element array and a second print element array in each of which print elements each for applying an ink droplet are arrayed, and reciprocally scans in a first direction and a second direction reverse to the first direction, and the generation unit generates the print data so that:

a first edge region of the target object where a ratio of pixels printed by at least one print element included in the first print element array to a plurality of pixels included in the first edge region is lower than a ratio of pixels printed by at least one print element included in the second print element array is a region contacting a boundary at which the object changes to a margin region of a print medium when viewed in the first direction, and a second edge region of the target object where a ratio of pixels printed by at least one print element included in the second print element array to a plurality of pixels included in the second edge region is lower than a ratio of pixels printed by at least one print element included in the first print element array is a region contacting a boundary at which the object changes to the margin region of the print medium when viewed in the second direction.

* * * * *